United States Patent
Wiig et al.

(10) Patent No.: US 8,990,308 B2
(45) Date of Patent: Mar. 24, 2015

(54) SYSTEM AND METHOD OF A REQUIREMENT, COMPLIANCE AND RESOURCE MANAGEMENT

(71) Applicants: Rex Wiig, Chino, CA (US); Angel Martinez, Anaheim, CA (US)

(72) Inventors: Rex Wiig, Chino, CA (US); Angel Martinez, Anaheim, CA (US)

( * ) Notice: Subject to any disclaimer, the term of this patent is extended or adjusted under 35 U.S.C. 154(b) by 0 days.

(21) Appl. No.: 13/573,634

(22) Filed: Sep. 28, 2012

(65) Prior Publication Data

US 2014/0095623 A1    Apr. 3, 2014

(51) Int. Cl.
*G06F 15/16*    (2006.01)

(52) U.S. Cl.
USPC .......................................................... 709/205

(58) Field of Classification Search
CPC ........................... H04L 29/08072; H04L 9/06
USPC .......................................................... 709/205
See application file for complete search history.

(56) References Cited

U.S. PATENT DOCUMENTS

| | | | |
|---|---|---|---|
| 6,405,364 B1 * | 6/2002 | Bowman-Amuah | 717/101 |
| 6,615,166 B1 * | 9/2003 | Guheen et al. | 703/27 |
| 6,959,268 B1 * | 10/2005 | Myers, Jr. et al. | 703/6 |
| 7,529,644 B2 * | 5/2009 | Lenz et al. | 702/183 |
| 8,095,472 B2 * | 1/2012 | Springborn et al. | 705/301 |
| 8,538,800 B2 * | 9/2013 | Gupta et al. | 705/7.39 |
| 8,583,797 B2 * | 11/2013 | Radia et al. | 709/226 |
| 2004/0193698 A1 * | 9/2004 | Lakshminarayana | 709/218 |
| 2004/0210903 A1 * | 10/2004 | Kosanovic et al. | 718/105 |
| 2006/0075009 A1 * | 4/2006 | Lenz et al. | 708/160 |
| 2006/0173726 A1 * | 8/2006 | Hall et al. | 705/8 |
| 2006/0178918 A1 * | 8/2006 | Mikurak | 705/7 |
| 2007/0177500 A1 * | 8/2007 | Chang et al. | 370/229 |
| 2007/0266138 A1 * | 11/2007 | Spire et al. | 709/223 |
| 2008/0148105 A1 * | 6/2008 | Hisatomi et al. | 714/47 |
| 2009/0055796 A1 * | 2/2009 | Springborn et al. | 717/102 |
| 2009/0138860 A1 * | 5/2009 | Fusegawa et al. | 717/131 |
| 2011/0067032 A1 * | 3/2011 | Daly et al. | 718/103 |
| 2011/0145153 A1 * | 6/2011 | Dawson et al. | 705/80 |
| 2011/0251868 A1 * | 10/2011 | Mikurak | 705/7.25 |
| 2012/0254434 A1 * | 10/2012 | Mehra et al. | 709/226 |
| 2013/0055399 A1 * | 2/2013 | Zaitsev | 726/25 |

* cited by examiner

*Primary Examiner* — Guang Li

(57) ABSTRACT

A system and/or a method based on a scalable requirement, compliance and resource management methodology for designing a product/service, optimizing relevant processes and enhancing real time and/or near real time collaboration between many users. The requirement, compliance and resource management methodology is further integrated with a fuzzy logic algorithm module and/or statistical algorithm module and/or weighting logic algorithm module and enhanced with a graphical user interface.

19 Claims, 47 Drawing Sheets

Requirement Count Per Event Number

100D

| Event | | Number of Requirements | | | | | | | | | | | |
|---|---|---|---|---|---|---|---|---|---|---|---|---|---|
| | | Analysis | | Inspection | | Demo | | Test | | Total | | |
| Number | Title | Alloc | Verif Status | Alloc | Verif Status | Alloc | Verif Status | Alloc | Verif Status | Alloc | Verif | Status |
| 1000 - 00 | System A Mission Countdown Test | 6 | 2 33.3% | 3 | 0 0.0% | 0 | 0 0.0% | 0 | 1 0.0% | 9 | 3 | 33.3% |
| 1001 - 00 | System A Software | 4 | 2 50.0% | 1 | 0 0.0% | 0 | 0 0.0% | 0 | 0 0.0% | 5 | 2 | 40.0% |
| 1002 - 00 | System A End-to-End Test | 4 | 0 0.0% | 0 | 0 0.0% | 0 | 0 0.0% | 0 | 0 0.0% | 4 | 0 | 0.0% |
| 1003 - 00 | System A Mass Properties | 3 | 0 0.0% | 1 | 0 0.0% | 1 | 0 0.0% | 0 | 0 0.0% | 5 | 0 | 0.0% |
| 1004 - 00 | System B Functional Test | 2 | 0 0.0% | 2 | 0 0.0% | 2 | 0 0.0% | 0 | 0 0.0% | 6 | 0 | 0.0% |
| 1005 - 00 | System B Software Qualification | 0 | 0 0.0% | 0 | 0 0.0% | 0 | 0 0.0% | 3 | 0 0.0% | 3 | 0 | 0.0% |
| 1006 - 00 | System B Reliability | 4 | 0 0.0% | 0 | 0 0.0% | 2 | 0 0.0% | 0 | 0 0.0% | 6 | 0 | 0.0% |
| 1007 - 00 | System B Mass Properties | 2 | 0 0.0% | 2 | 0 0.0% | 0 | 0 0.0% | 0 | 0 0.0% | 4 | 0 | 0.0% |
| 1008 - 00 | System B Thermal Test | 2 | 0 0.0% | 2 | 0 0.0% | 0 | 0 0.0% | 0 | 0 0.0% | 4 | 0 | 0.0% |
| 1009 - 00 | System B Design and Construction | 2 | 0 0.0% | 2 | 0 0.0% | 1 | 0 0.0% | 0 | 0 0.0% | 5 | 0 | 0.0% |
| 1010 - 00 | System C Power-up Test | 3 | 0 0.0% | 1 | 0 0.0% | 0 | 0 0.0% | 0 | 0 0.0% | 4 | 0 | 0.0% |
| 1011 - 00 | System C Data Transmission | 1 | 0 0.0% | 0 | 0 0.0% | 2 | 0 0.0% | 2 | 0 0.0% | 5 | 0 | 0.0% |
| 1012 - 00 | System C Mass Properties | 0 | 0 0.0% | 0 | 0 0.0% | 2 | 0 0.0% | 2 | 0 0.0% | 4 | 0 | 0.0% |
| 1013 - 00 | System C Reliability | 3 | 0 0.0% | 0 | 0 0.0% | 1 | 0 0.0% | 0 | 0 0.0% | 4 | 0 | 0.0% |
| 1014 - 00 | System C Thermal | 2 | 0 0.0% | 2 | 0 0.0% | 0 | 0 0.0% | 0 | 0 0.0% | 4 | 0 | 0.0% |
| 1015 - 00 | System C Design and Construction | 1 | 0 0.0% | 0 | 0 0.0% | 1 | 0 0.0% | 3 | 0 0.0% | 5 | 0 | 0.0% |
| Total | | 39 | 4 10.3% | 16 | 0 0.0% | 12 | 0 0.0% | 10 | 1 10.0% | 77 | 5 | 6.5% |

FIG. 5B

REQUIREMENT, COMPLIANCE AND RESOURCE MANAGEMENT METHODOLOGY 100

| | FEATURES | BENEFITS |
|---|---|---|
| | SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| | PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| 100A | EMAIL NOTIFICATION FOR REQUIREMENT CHANGES. | FASTER RESPONSE TIME FOR PROGRAM CHANGE ASSESSMENT AND IMPLEMENTATION. |
| | CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| | KEYWORD SEARCH CAPABILITY. | ALLOWS FOR QUICK ACCESS TO REQUIREMENTS AND ITEMS OF INTEREST. SEARCHES ENTIRE DATABASE WITH SINGLE QUERY. |
| | EMBEDDED CONFIGURATION MANAGEMENT. | ENSURES REQUIREMENTS BASELINE IS UNDER STRICT CONFIGURATION CONTROL. MAINTAINS DETAILED HISTORY OF ALL CHANGES AGAINST SPECIFIC REQUIREMENT ATTRIBUTES. |
| | SPECIFICATION AUTHOR "BOOK BOSS" ASSIGNMENTS. | PROVIDES ABILITY TO ASSIGN PERSONNEL WITH READ/ WRITE ACCESS TO SPECIFICATIONS AND REQUIREMENTS. |

FIG. 6A

REQUIREMENT, COMPLIANCE AND RESOURCE MANAGEMENT METHODOLOGY 100

| | FEATURES | BENEFITS |
|---|---|---|
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL /PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| 100D | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |

FIG. 6B

REQUIREMENT, COMPLIANCE AND RESOURCE MANAGEMENT METHODOLOGY 100

| | FEATURES | BENEFITS |
|---|---|---|
| 100D | OPEN ACTION STATUS. | QUICK AND EASY ACCESS TO PROGRAM ACTION ITEMS AND COMPLETION STATUS. |
| | PROGRAM USAGE STATISTICS. | REAL-TIME METRICS WHICH DISPLAY IRIS USER STATISTICS SUCH AS USER FREQUENCY AND DURATION. |
| | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS. FLAGS USER IF A HARDWARE/SOFTWARE SCHEDULING CONFLICT EXISTS. PROVIDES RESOURCE TIME AND COST FOR EACH EVENT. |
| 100E | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS. FLAGS USER IF A PERSONNEL SCHEDULING CONFLICT EXISTS. PROVIDE RESOURCE TIME AND COST FOR EACH EVENT. |

FIG. 6C

REQUIREMENT, COMPLIANCE AND RESOURCE MANAGEMENT METHODOLOGY 100

| | FEATURES | BENEFITS |
|---|---|---|
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES. INSTITUTES AN ENVIRONMENT OF COLLABORATION ENSURING EARLY IDENTIFICATION OF RISKS. |
| | CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES. PROVIDES ABILITY FOR USERS TO SEE IF THEY CAN MOVE REQUIREMENTS TO ANOTHER EVENT AND THE EVENT IN QUESTION MAY ALSO ELIMINATED THEREBY STREAMLINING VERIFICATION ACTIVITIES. |
| | EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| | EVENT CONFIGURATION CONTROL AND CHANGE HISTORY. | ENSURES VERIFICATION BASELINE IS UNDER STRICT CONFIGURATION CONTROL. MAINTAINS DETAILED HISTORY OF ALL CHANGES AGAINST SPECIFIC VERIFICATION ACTIVITIES. |

FIG. 6D

REQUIREMENT, COMPLIANCE AND RESOURCE MANAGEMENT METHODOLOGY 100

| | FEATURES | BENEFITS |
|---|---|---|
| | TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| 100F | VERIFICATION ACTIVITY LINKAGE TO MS PROJECT SCHEDULES. | TIGHTLY COUPLES VERIFICATION ACTIVITIES WITH PROGRAM MILESTONES TO ENSURE TIMELY END-ITEM DELIVERY. |
| | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. REQUIRES MINIMAL USER TRAINING. |
| | READY FOR USE UPON INSTALLATION. | NO CUSTOM SCRIPTING REQUIRED RESULTS IN LOWER IMPLEMENTATION COST, FASTER USAGE. MAY BE TAILORED TO SUPPORT SPECIFIC PROJECT PROCESSESS. |

FIG. 6E

REQUIREMENT, COMPLIANCE AND RESOURCE MANAGEMENT METHODOLOGY 120

| FEATURES | BENEFITS |
|---|---|
| SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| EMAIL NOTIFICATION FOR REQUIREMENT CHANGES. | FASTER RESPONSE TIME FOR PROGRAM CHANGE ASSESSMENT AND IMPLEMENTATION. |
| CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| KEYWORD SEARCH CAPABILITY. | ALLOWS FOR QUICK ACCESS TO REQUIREMENTS AND ITEMS OF INTEREST. SEARCHES ENTIRE DATABASE WITH SINGLE QUERY. |
| EMBEDDED CONFIGURATION MANAGEMENT. | ENSURES REQUIREMENTS BASELINE IS UNDER STRICT CONFIGURATION CONTROL. MAINTAINS DETAILED HISTORY OF ALL CHANGES AGAINST SPECIFIC REQUIREMENT ATTRIBUTES. |
| SPECIFICATION AUTHOR "BOOK BOSS" ASSIGNMENTS. | PROVIDES ABILITY TO ASSIGN PERSONNEL WITH READ/WRITE ACCESS TO SPECIFICATIONS AND REQUIREMENTS. |

REQUIREMENT, COMPLIANCE AND RESOURCE MANAGEMENT METHODOLOGY 120

| | FEATURES | BENEFITS |
|---|---|---|
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL/PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| 100D | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |
| | OPEN ACTION STATUS. | QUICK AND EASY ACCESS TO PROGRAM ACTION ITEMS AND COMPLETION STATUS. |

FIG. 8B

REQUIREMENT, COMPLIANCE AND RESOURCE MANAGEMENT METHODOLOGY 120

| | FEATURES | BENEFITS |
|---|---|---|
| 100D | PROGRAM USAGE STATISTICS. | REAL-TIME METRICS WHICH DISPLAY IRIS USER STATISTICS SUCH AS USER FREQUENCY AND DURATION. |
| 100E | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS. FLAGS USER IF A HARDWARE/SOFTWARE SCHEDULING CONFLICT EXISTS. PROVIDES RESOURCE TIME AND COST FOR EACH EVENT. |
| | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS. FLAGS USER IF A PERSONNEL SCHEDULING CONFLICT EXISTS. PROVIDE RESOURCE TIME AND COST FOR EACH EVENT. |
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES. INSTITUTES AN ENVIRONMENT OF COLLABORATION ENSURING EARLY IDENTIFICATION OF RISKS. |

FIG. 8C

REQUIREMENT, COMPLIANCE AND RESOURCE MANAGEMENT METHODOLOGY 120

| | FEATURES | BENEFITS |
|---|---|---|
| 100F | CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES. PROVIDES ABILITY FOR USERS TO SEE IF THEY CAN BE MOVE REQUIREMENTS TO ANOTHER EVENT AND THE EVENT IN QUESTION MAY ALSO ELIMINATED THEREBY STREAMLINING VERIFICATION ACTIVITIES. |
| | EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| | EVENT CONFIGURATION CONTROL AND CHANGE HISTORY. | ENSURES VERIFICATION BASELINE IS UNDER STRICT CONFIGURATION CONTROL. MAINTAINS DETAILED HISTORY OF ALL CHANGES AGAINST SPECIFIC VERIFICATION ACTIVITIES. |
| | TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| | VERIFICATION ACTIVITY LINKAGE TO MS PROJECT SCHEDULES. | TIGHTLY COUPLES VERIFICATION ACTIVITIES WITH PROGRAM MILESTONES TO ENSURE TIMELY END-ITEM DELIVERY. |

FIG. 8D

REQUIREMENT, COMPLIANCE AND RESOURCE MANAGEMENT METHODOLOGY 120

| | FEATURES | BENEFITS |
|---|---|---|
| 100F | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. |
| | READY FOR USE UPON INSTALLATION. | NO CUSTOM SCRIPTING REQUIRED RESULTS IN LOWER IMPLEMENTATION COST, FASTER USAGE. MAY BE TAILORED TO SUPPORT SPECIFIC PROJECT PROCESSES. |
| 100C1 | PROJECT SETUP QUESTION AND ANSWER. | STEP-BY-STEP QUESTION AND ANSWER THAT ALLOWS USER TO QUICKLY AND EASILY SET UP A NEW PROJECT. |
| | DECISION BASED ON FUZZY APPROXIMATION. | ENABLES PROGRAM DECISION MAKERS TO ASSESS WHEN VERIFICATION IS GOOD ENOUGH. |
| 100F1 | "REQUIREMENT GOODNESS" CHECK. | EVALUATES REQUIREMENT GOODNESS THEREBY REDUCING REQUIREMENT REWORK AND VERIFICATION RESOURCE WASTE. |

FIG. 8E

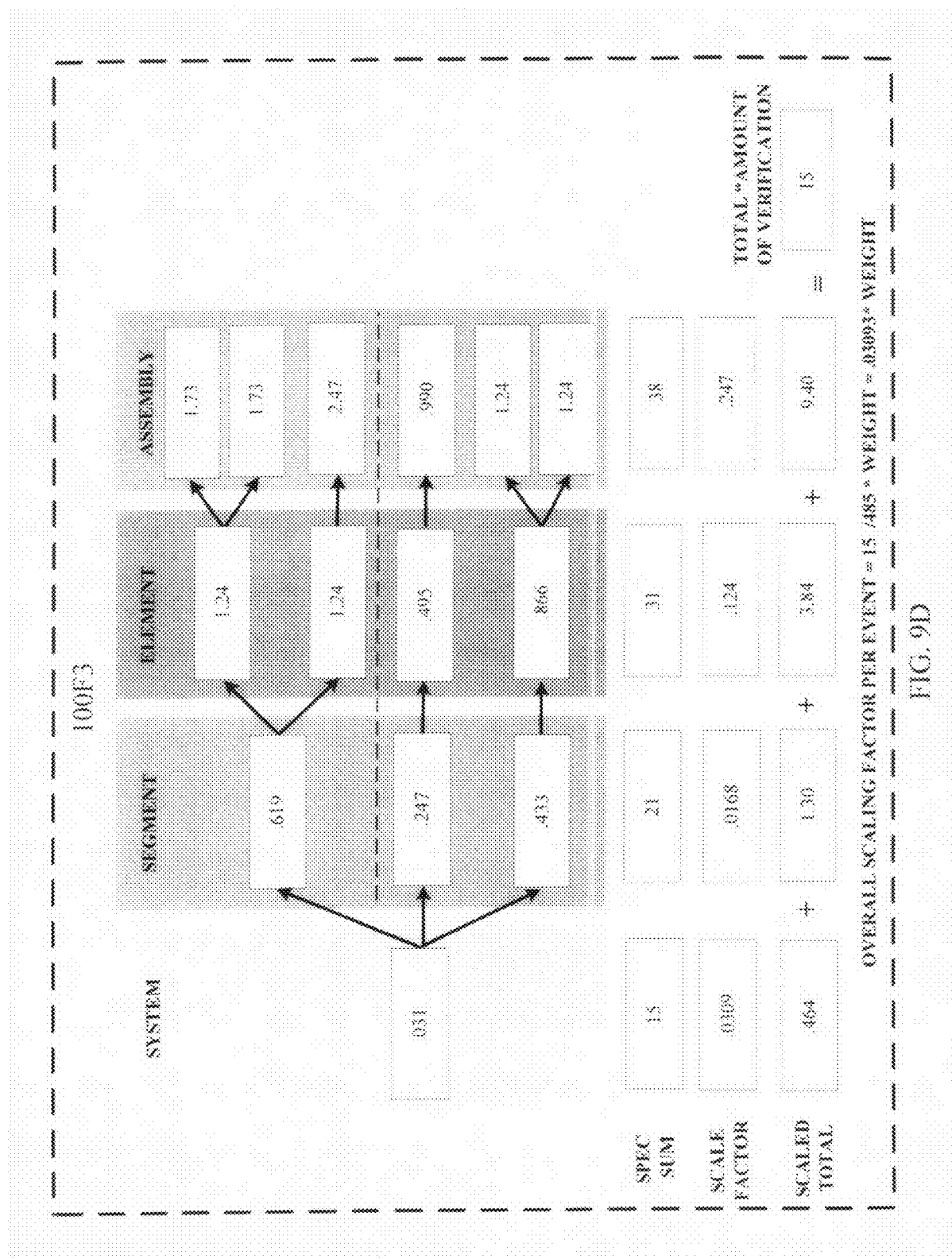

REQUIREMENT, COMPLIANCE AND RESOURCE MANAGEMENT METHODOLOGY 140

| | FEATURES | BENEFITS |
|---|---|---|
| 100A | SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| | PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| | EMAIL NOTIFICATION FOR REQUIREMENT CHANGES. | FASTER RESPONSE TIME FOR PROGRAM CHANGE ASSESSMENT AND IMPLEMENTATION. |
| | CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| | KEYWORD SEARCH CAPABILITY. | ALLOWS FOR QUICK ACCESS TO REQUIREMENTS AND ITEMS OF INTEREST. SEARCHES ENTIRE DATABASE WITH SINGLE QUERY. |
| | EMBEDDED CONFIGURATION MANAGEMENT. | ENSURES REQUIREMENTS BASELINE IS UNDER STRICT CONFIGURATION CONTROL. MAINTAINS DETAILED HISTORY OF ALL CHANGES AGAINST SPECIFIC REQUIREMENT ATTRIBUTES. |

FIG. 10A

REQUIREMENT, COMPLIANCE AND RESOURCE MANAGEMENT METHODOLOGY 140

| | FEATURES | BENEFITS |
|---|---|---|
| 100A | SPECIFICATION AUTHOR "BOOK BOSS" ASSIGNMENTS. | PROVIDES ABILITY TO ASSIGN PERSONNEL WITH READ/WRITE ACCESS TO SPECIFICATIONS AND REQUIREMENTS. |
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL /PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| 100D | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |
| | OPEN ACTION STATUS. | QUICK AND EASY ACCESS TO PROGRAM ACTION ITEMS AND COMPLETION STATUS. |

FIG. 10B

REQUIREMENT, COMPLIANCE AND RESOURCE MANAGEMENT METHODOLOGY 140

| | FEATURES | BENEFITS |
|---|---|---|
| 100D | PROGRAM USAGE STATISTICS. | REAL-TIME METRICS WHICH DISPLAY IRIS USER STATISTICS SUCH AS USER FREQUENCY AND DURATION. |
| 100E | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS. FLAGS USER IF A HARDWARE/SOFTWARE SCHEDULING CONFLICT EXISTS. PROVIDES RESOURCE TIME AND COST FOR EACH EVENT. |
| | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS. FLAGS USER IF A PERSONNEL SCHEDULING CONFLICT EXISTS. PROVIDE RESOURCE TIME AND COST FOR EACH EVENT. |
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES. INSTITUTES AN ENVIRONMENT OF COLLABORATION ENSURING EARLY IDENTIFICATION OF RISKS. |

FIG. 10C

REQUIREMENT, COMPLIANCE AND RESOURCE MANAGEMENT METHODOLOGY 140

| FEATURES | BENEFITS |
|---|---|
| CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES. PROVIDES ABILITY FOR USERS TO SEE IF THEY CAN BE MOVE REQUIREMENTS TO ANOTHER EVENT AND THE EVENT IN QUESTION MAY ALSO ELIMINATED THEREBY STREAMLINING VERIFICATION ACTIVITIES. |
| EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| EVENT CONFIGURATION CONTROL AND CHANGE HISTORY. | ENSURES VERIFICATION BASELINE IS UNDER STRICT CONFIGURATION CONTROL. MAINTAINS DETAILED HISTORY OF ALL CHANGES AGAINST SPECIFIC VERIFICATION ACTIVITIES. |
| TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| VERIFICATION ACTIVITY LINKAGE TO MS PROJECT SCHEDULES | TIGHTLY COUPLES VERIFICATION ACTIVITIES WITH PROGRAM MILESTONES TO ENSURE TIMELY END-ITEM DELIVERY. |

REQUIREMENT, COMPLIANCE AND RESOURCE MANAGEMENT METHODOLOGY 140

| | FEATURES | BENEFITS |
|---|---|---|
| 100F | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. |
| | READY FOR USE UPON INSTALLATION | NO CUSTOM SCRIPTING REQUIRED RESULTS IN LOWER IMPLEMENTATION COST, FASTER USAGE. MAY BE TAILORED TO SUPPORT SPECIFIC PROJECT PROCESSES. |
| 100C1 | PROJECT SETUP QUESTION AND ANSWER. | STEP-BY-STEP QUESTION AND ANSWER THAT ALLOWS USER TO QUICKLY AND EASILY SET UP A NEW PROJECT. |

FIG. 10E

REQUIREMENT, COMPLIANCE AND RESOURCE MANAGEMENT METHODOLOGY 140

| | FEATURES | BENEFITS |
|---|---|---|
| 100F1 | DECISION BASED ON FUZZY APPROXIMATION. | ENABLES PROGRAM DECISION MAKERS TO ASSESS WHEN VERIFICATION IS " GOOD ENOUGH". |
| | "REQUIREMENT GOODNESS" CHECK. | EVALUATES REQUIREMENT GOODNESS THEREBY REDUCING REQUIREMENT REWORK AND VERIFICATION RESOURCE WASTE. |
| 100F2 | VARIABILITY MEASUREMENT. | PROVIDES STATISTICAL ESTIMATING CAPABILITY FOR EMPIRICAL RESULTS THAT REQUIRE STATISTICAL MODELING TO ASSESS PERFORMANCE VARIABILITY. |
| 100F3 | TPM CALCULATOR (WEIGHTING LOGIC). | ALLOWS PROGRAM TO CALCULATE VALUE OF TPM THROUGHOUT INTEGRATION PROCESS. |

FIG. 10F

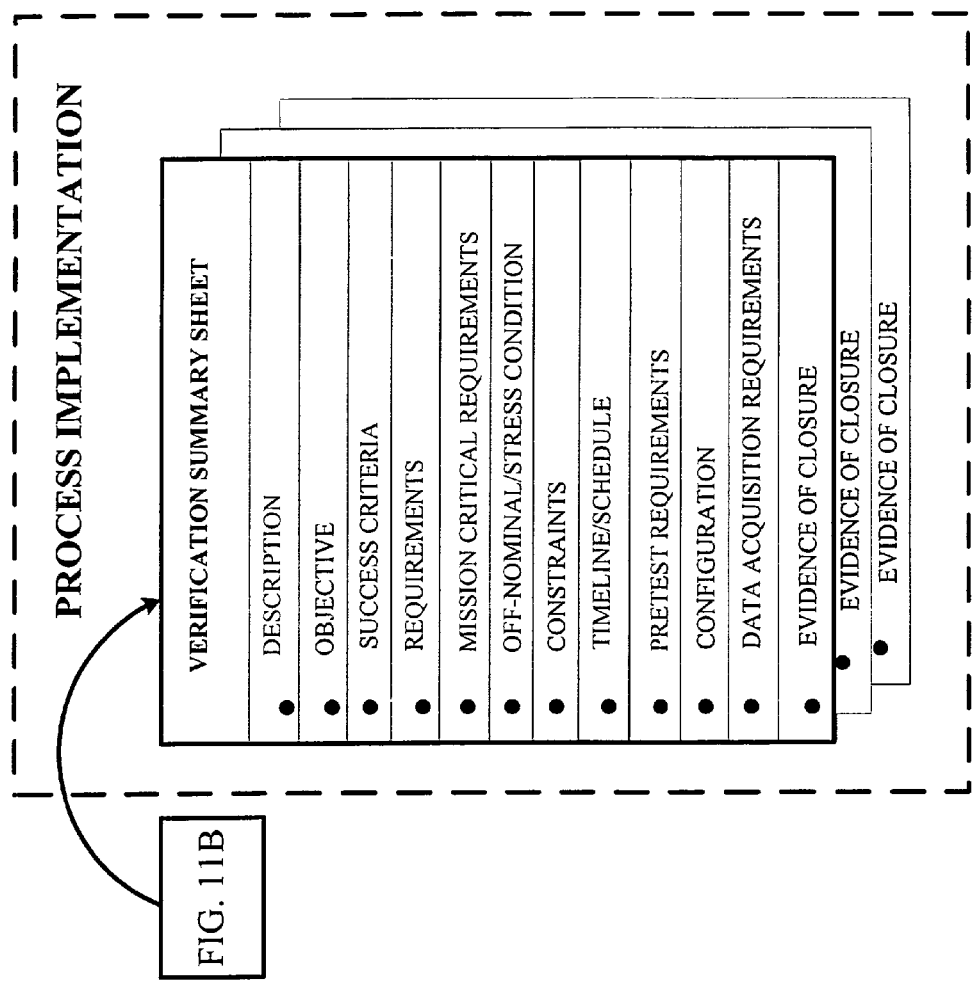

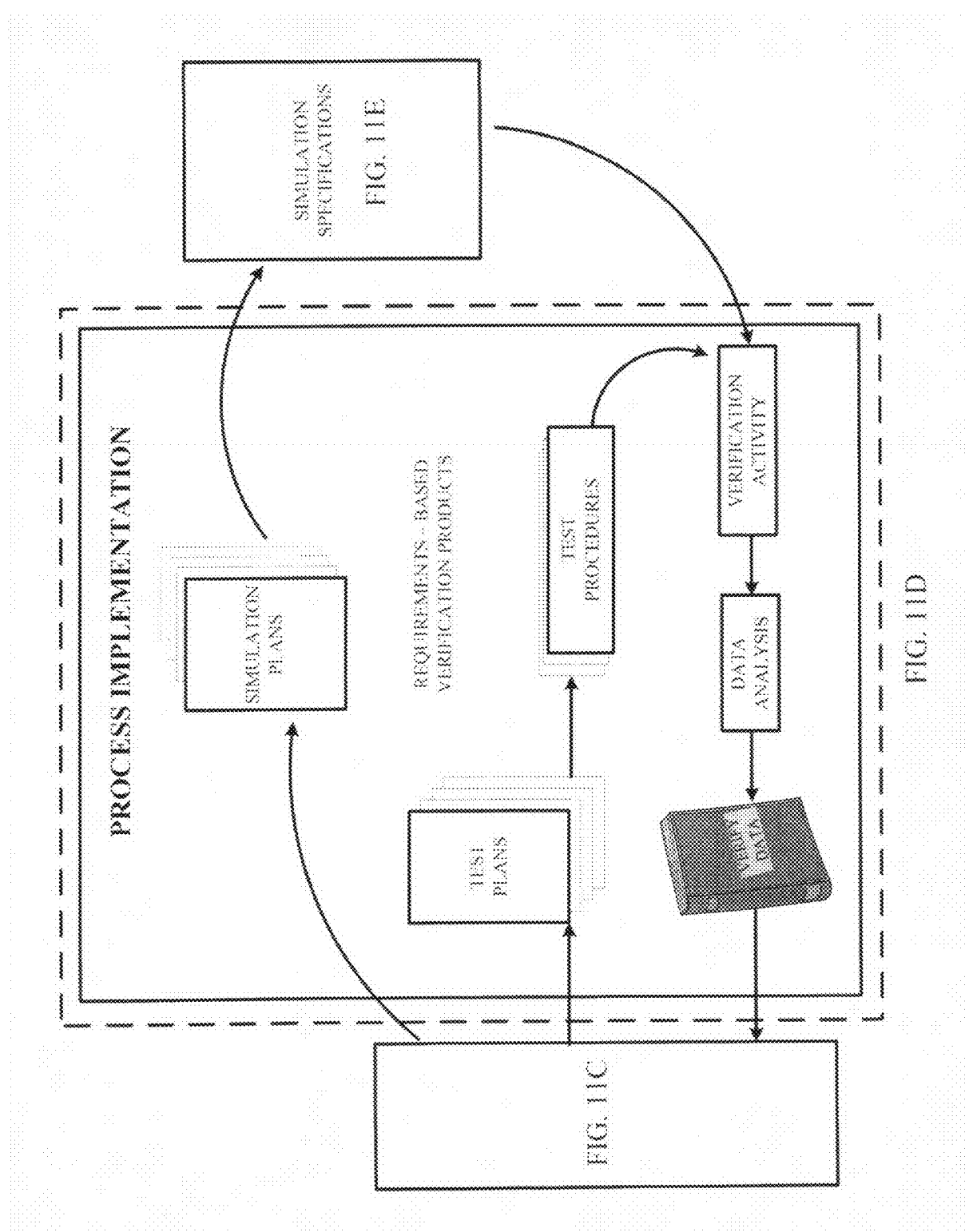

SYSTEM AND METHOD OF A REQUIREMENT, COMPLIANCE AND RESOURCE MANAGEMENT

FIELD OF THE INVENTION

The present invention is related to a system and/or a method based on a scalable requirement, compliance and resource management methodology.

The requirement, compliance and resource management methodology of the present invention is intended for (a) designing a product/service, (b) scoping end-to-end process steps, which are required for designing the product/service, (c) identifying critical constrains for designing the product/service, (d) optimizing relevant processes for designing the product/service, (e) evaluating requirement specifications of each process step for designing the product/service, (f) allocating resources (human capital and/or investment capital) for each process step for designing the product/service and (g) enhancing near real time and/or real time collaboration between users.

DESCRIPTION OF PRIOR ART

One currently available product IBM Rational DOORS® software program enables to capture, trace, analyze and manage changes to requirements. IBM Rational DOORS® also helps to demonstrate compliance to regulations and standards.

IBM Rational DOORS® software allows all stakeholders to actively participate in the requirements process. It has ability to manage changing requirements with scalability. Its life cycle traceability can help teams align the methods and processes and also measure the impact of such methods and processes.

BACKGROUND OF THE INVENTION

In sharp contrast to IBM Rational DOORS®, the requirement, compliance and resource management methodology of the present invention is uniquely enhanced with mathematical algorithms (e.g., fuzzy logic, statistics and weighting logic) to account for any inherent approximation, variability and uncertainty in a process step and/or all cumulative process steps. This is a significant innovation compared to IBM Rational DOORS®.

Furthermore, the requirement, compliance and resource management methodology of the present invention synthesizes optimization of relevant process steps, requirements, resources and critical constraints for near real time and/or real time collaboration.

Figure 5A:
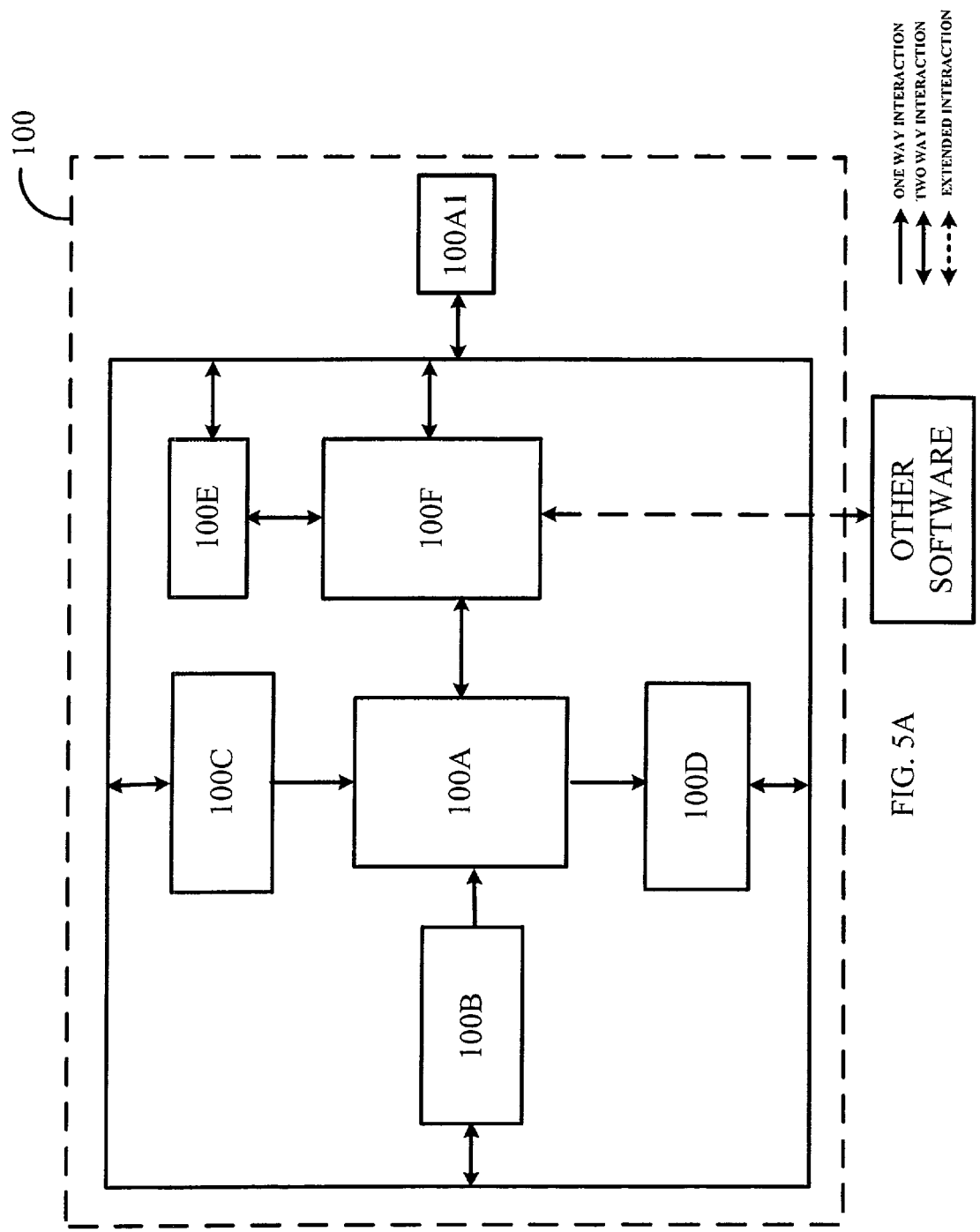
FIG. 5A (block diagram) describes one embodiment of the requirement, compliance and resource management methodology.
Figure 5C:
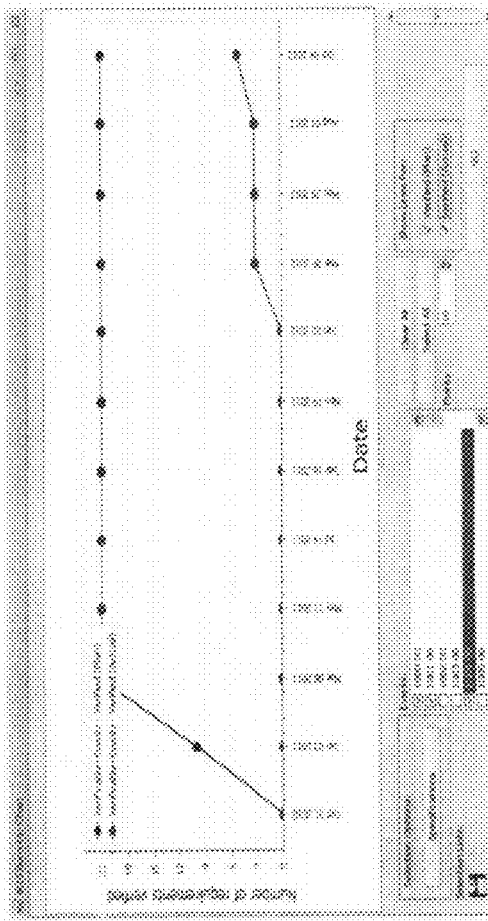
FIGS. 5B (schematic chart), 5C (schematic chart), 5D (schematic chart), 5E (schematic chart) and 5F (schematic chart) describe outputs of key components of the embodiment of the requirement, compliance and resource management methodology in FIG. 5A.
Figure 5D:
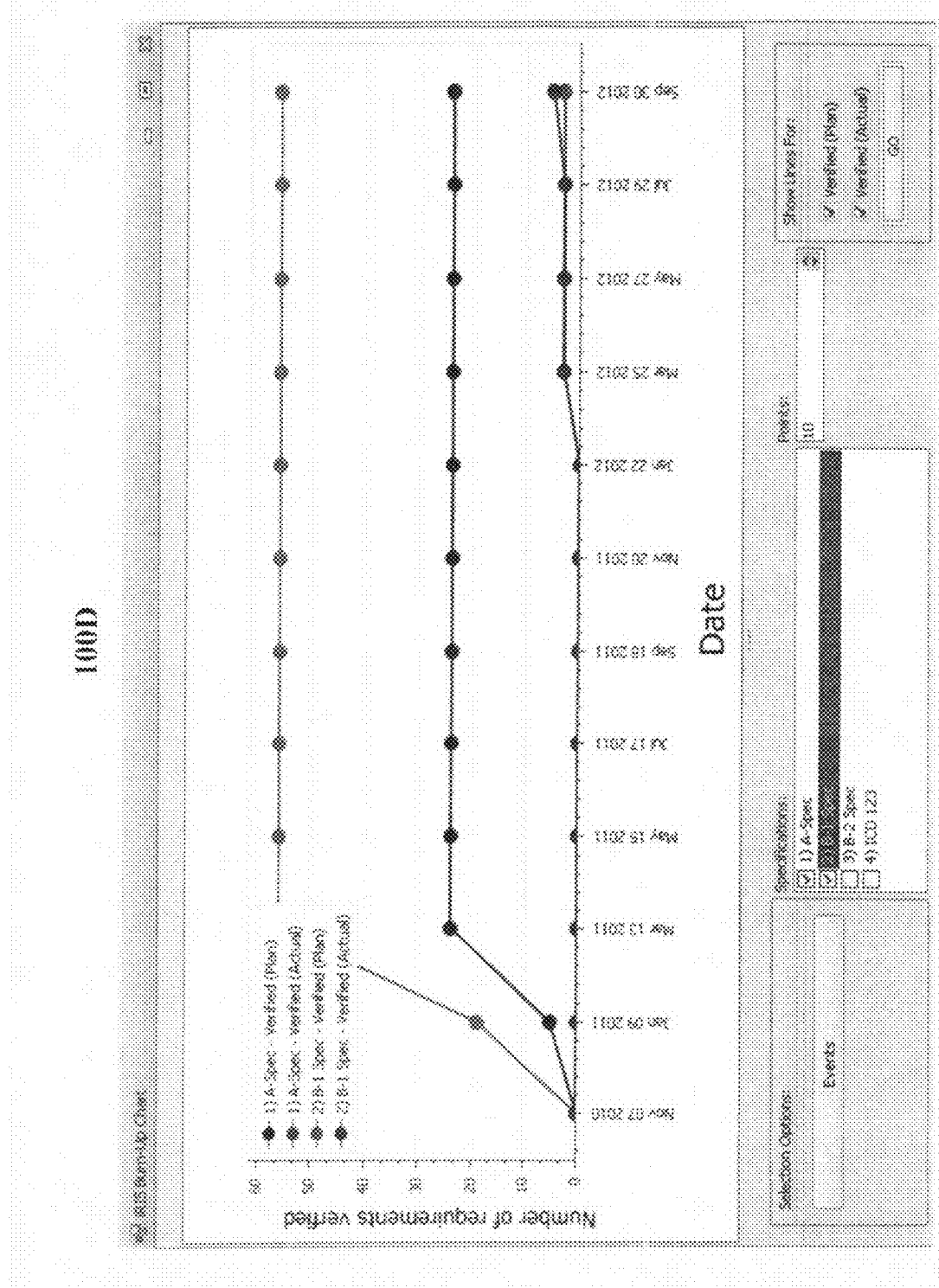
Figure 5E:
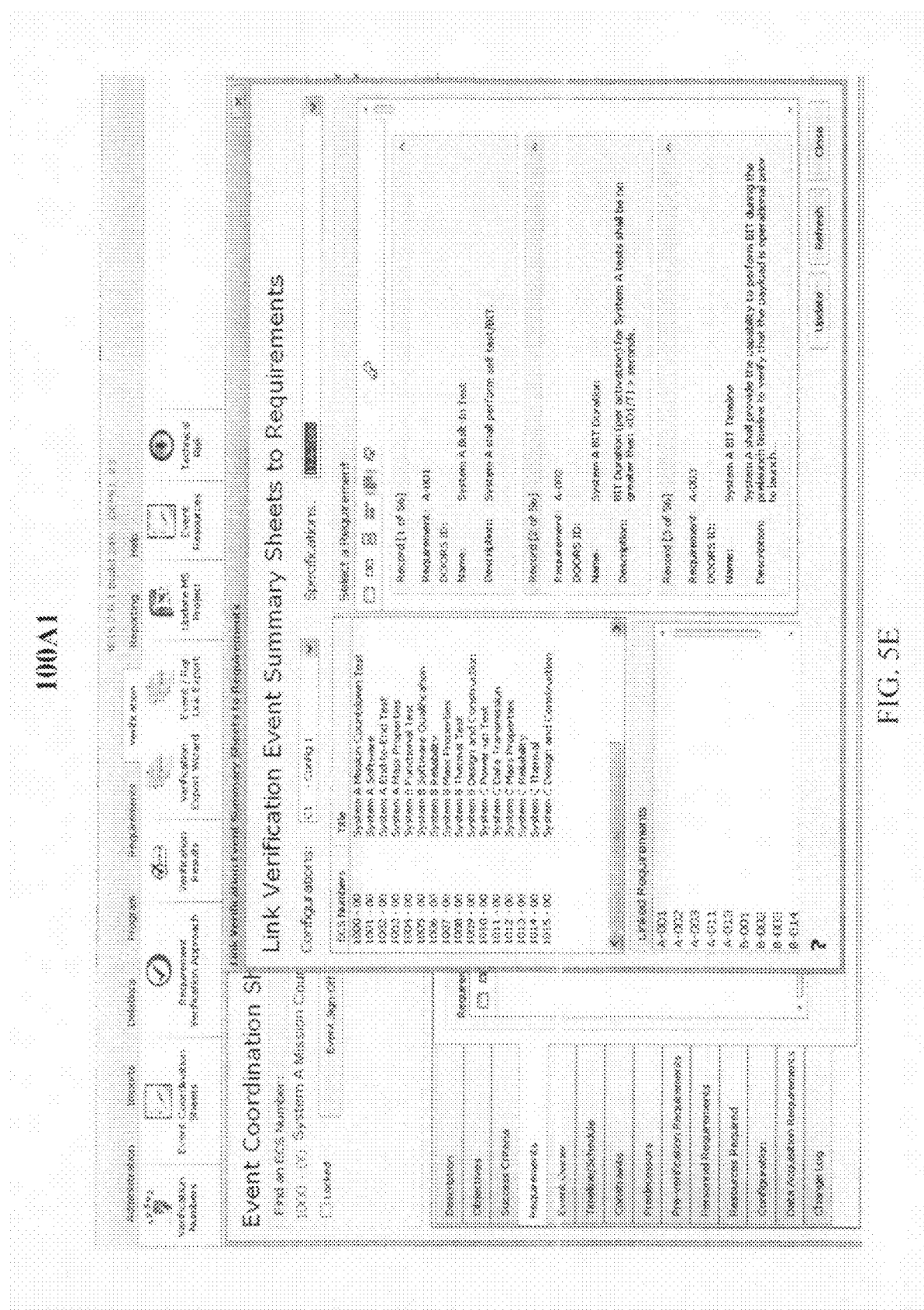

Tables 6A, 6B, 6C, 6D and 6E describe the features and benefits of the requirement, compliance and resource management methodology, as described in FIG. 5A.

Figure 7A:
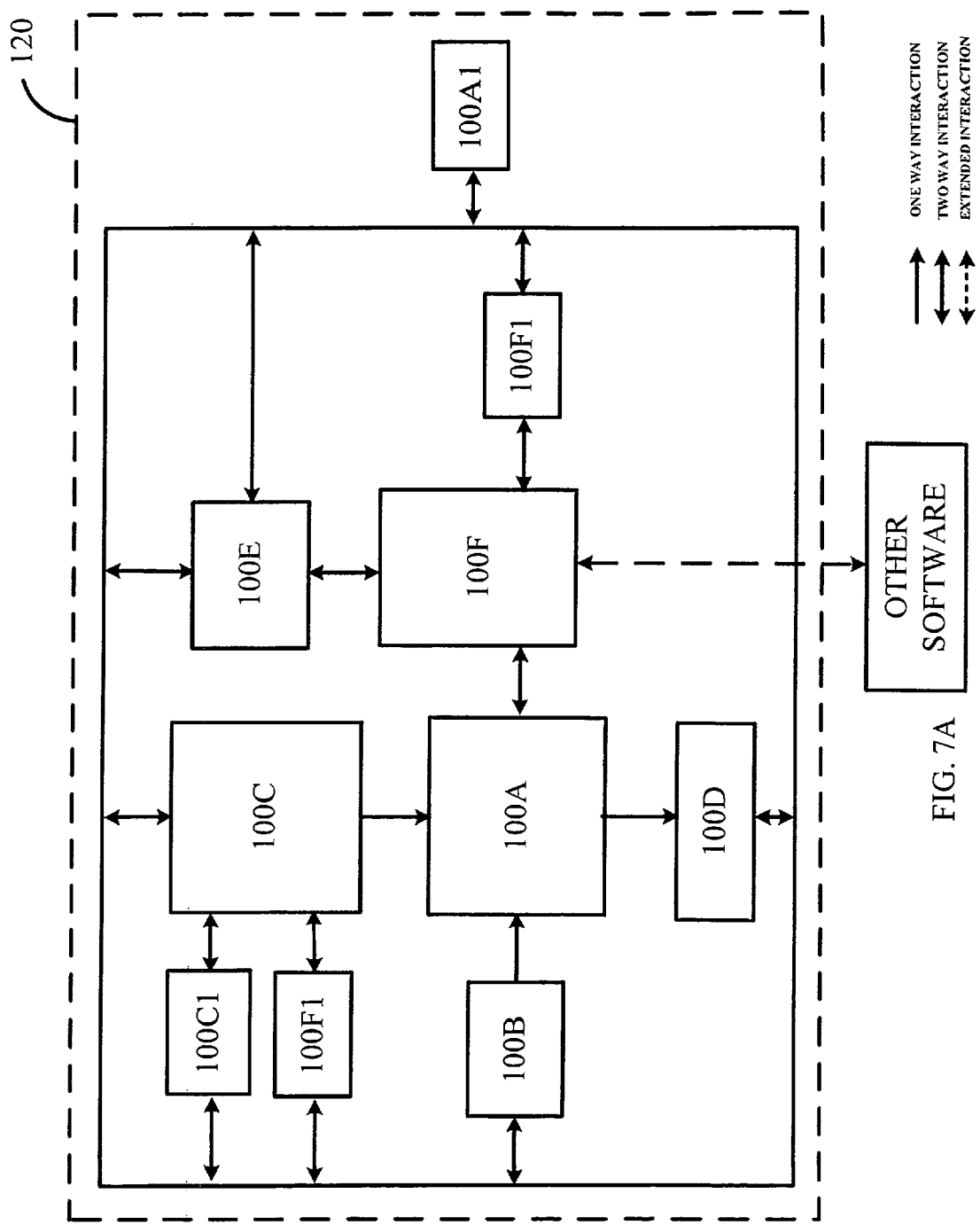

FIG. 7A (block diagram) describes another embodiment of the requirement, compliance and resource management methodology, further enhanced by a question/answer format of a requirement input module and a fuzzy logic algorithm module.

Figure 7B:
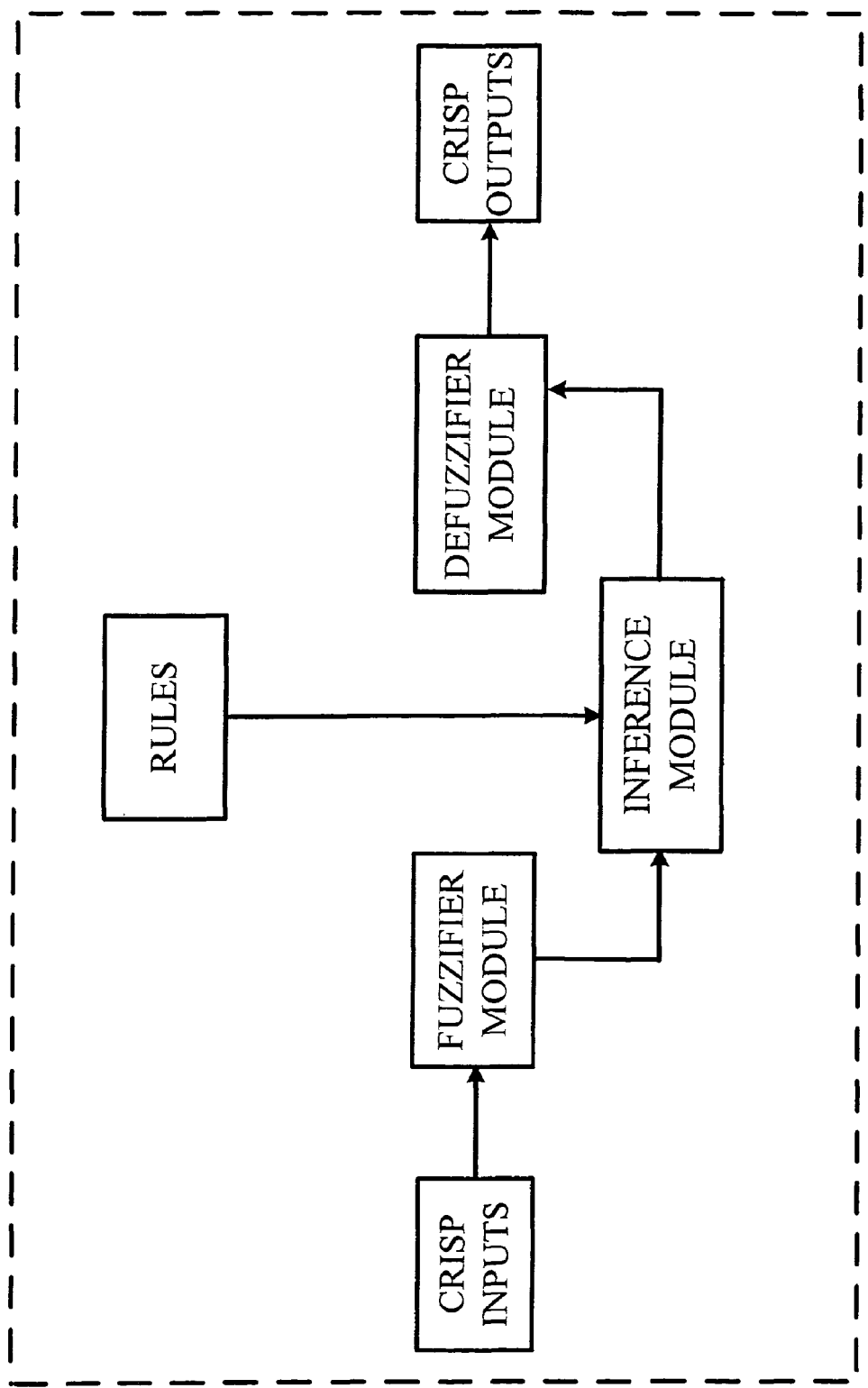

FIGS. 7B (schematic diagram) and 7C (schematic diagram) describe an application of the fuzzy logic module of the requirement, compliance and resource management methodology, as described in FIG. 7A.

Tables 8A, 8B, 8C, 8D and 8E describe the features and benefits of the requirement, compliance and resource management methodology, as described in FIG. 7A.

Figure 9A:
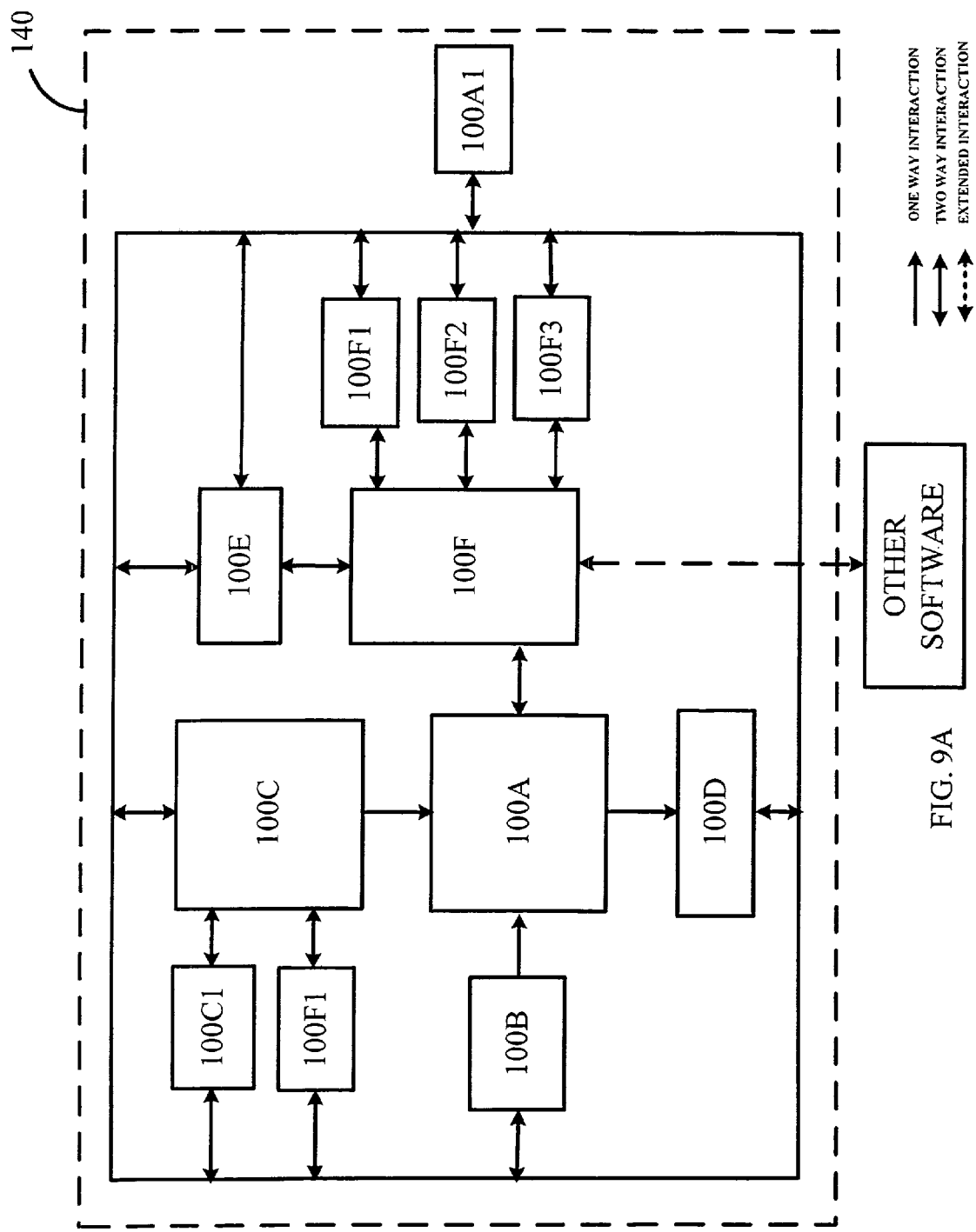

FIG. 9A (block diagram) describes another embodiment of the requirement, compliance and resource management methodology, further enhanced by a question/answer format of requirement input, a fuzzy logic algorithm module, a statistical algorithm module and a weighting logic algorithm module.

Figure 9B:
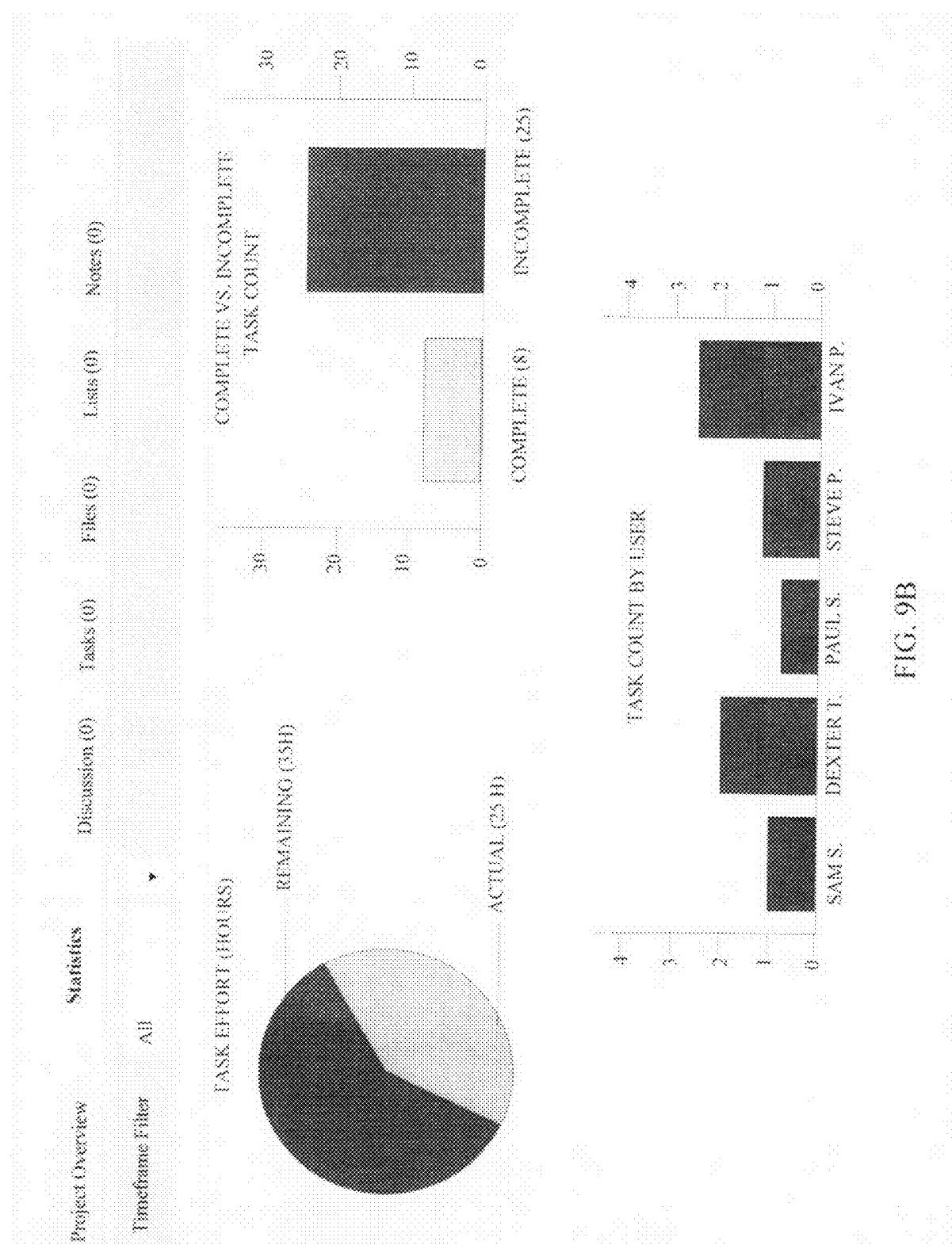

FIG. 9B describes an application of the statistical module of the requirement, compliance and resource management methodology, as described in FIG. 9A.

Figure 9C:
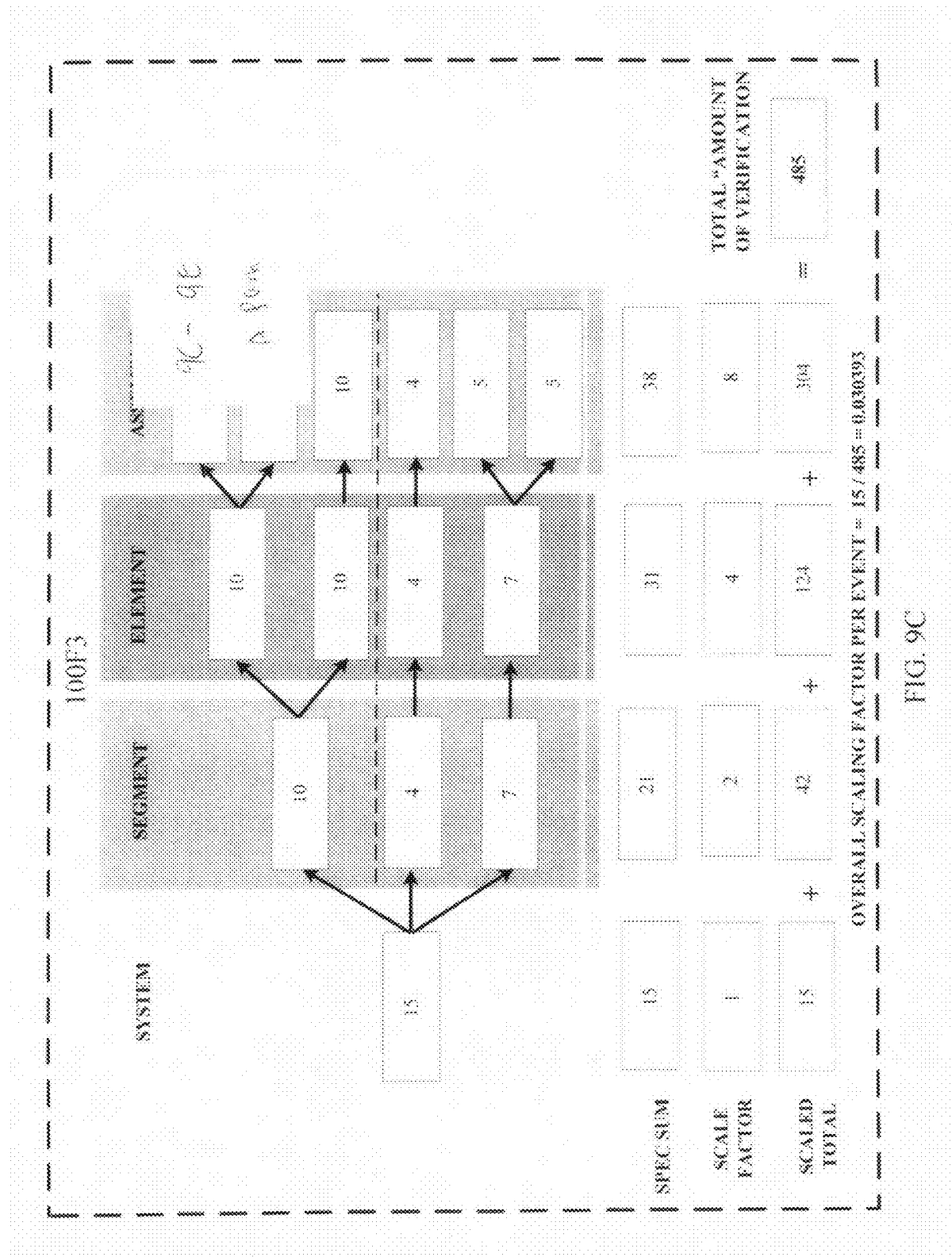
Figure 9E:
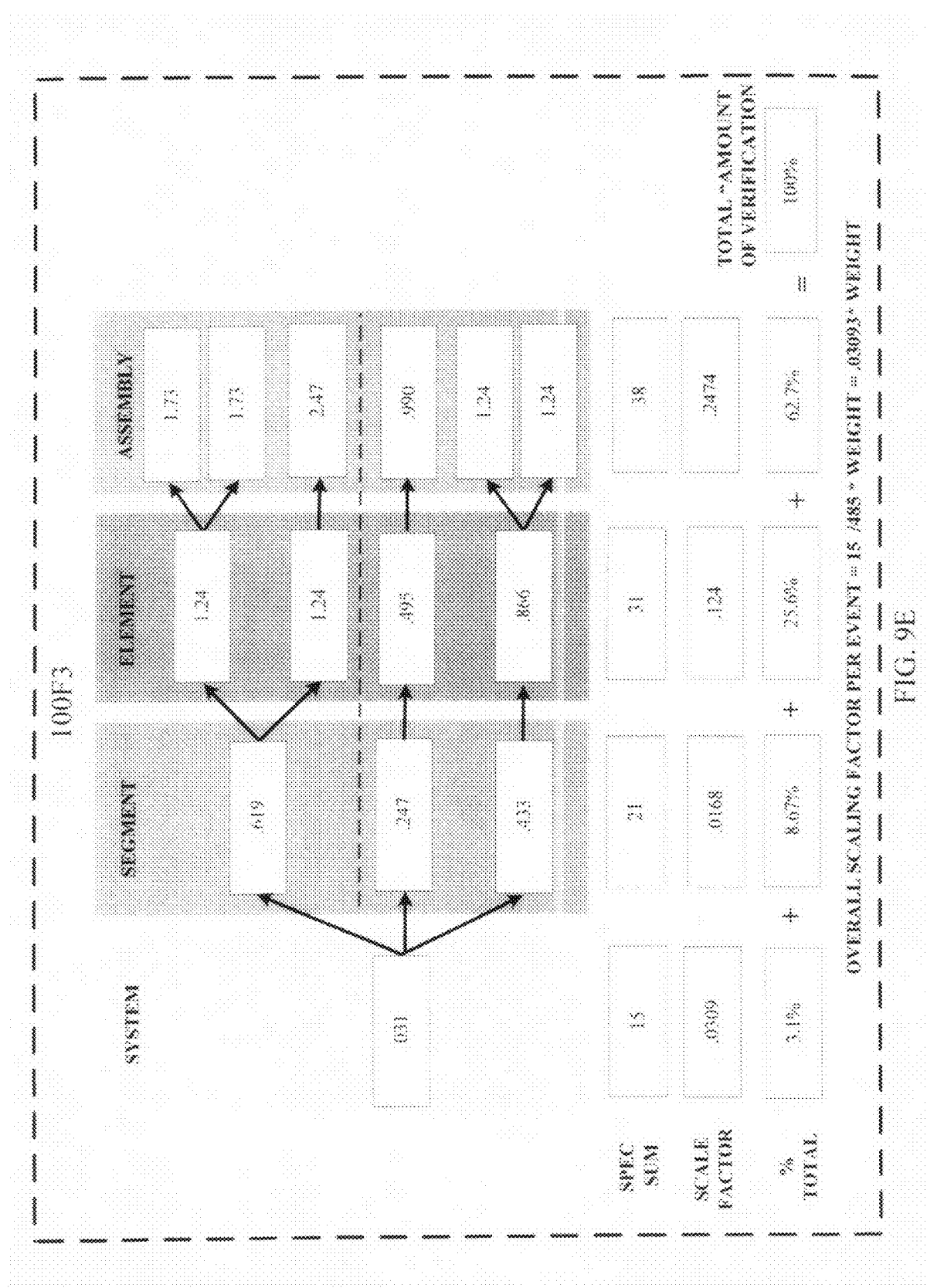

FIGS. 9C, 9D and 9E describe an application of the weighting logic module of the requirement, compliance and resource management methodology, as described in FIG. 9A.

Tables 10A, 10B, 10C, 10D, 10E and 10F describe the features and benefits of the requirement, compliance and resource management methodology, as described in FIG. 9A.

Figure 11A:
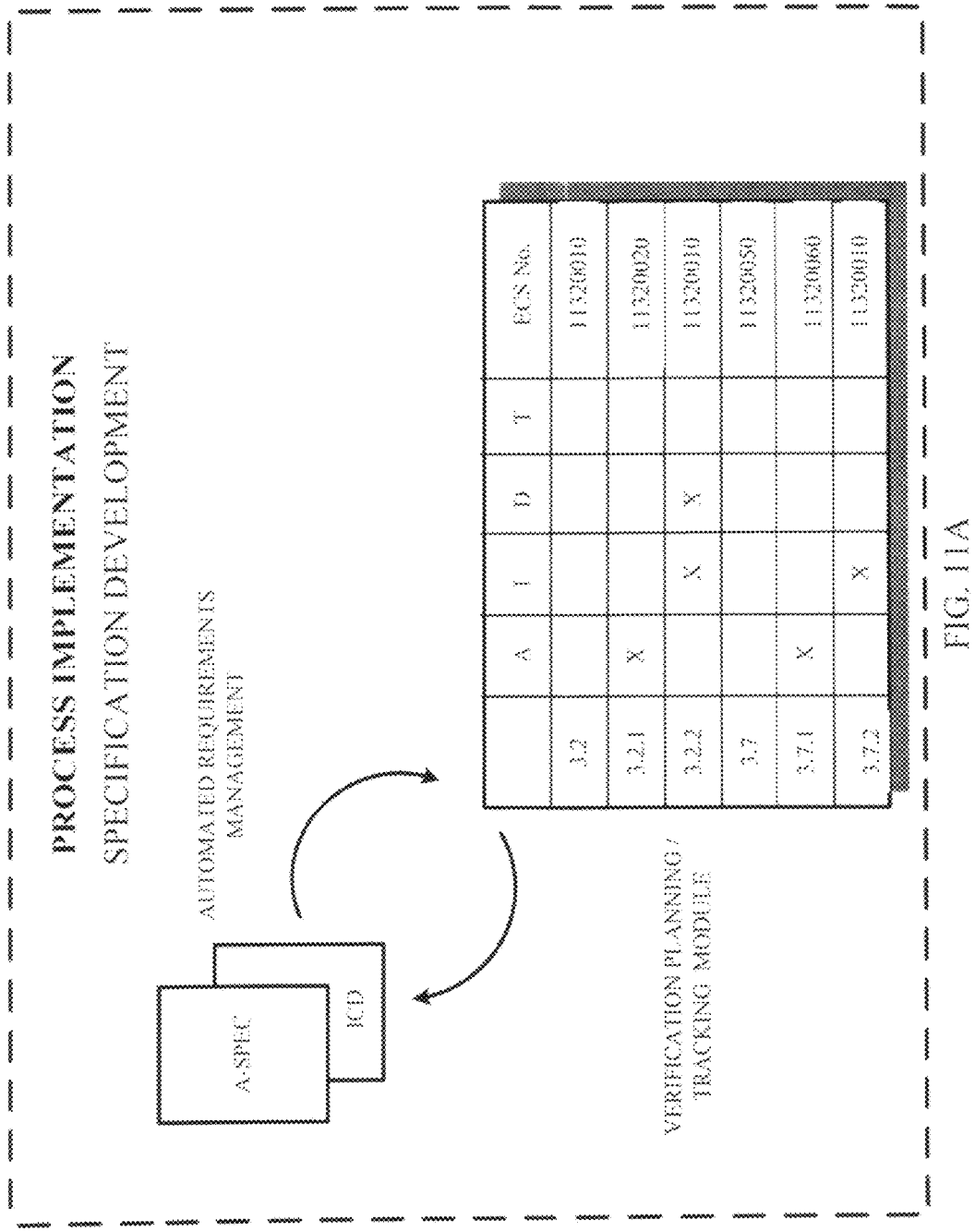

FIGS. 11A (schematic chart), 11B (schematic chart), 11C (schematic chart), 11D (schematic chart), 11E (schematic chart), 11F (schematic chart) and 11G (schematic chart) describe details of a typical process implementation.

Figure 12A:
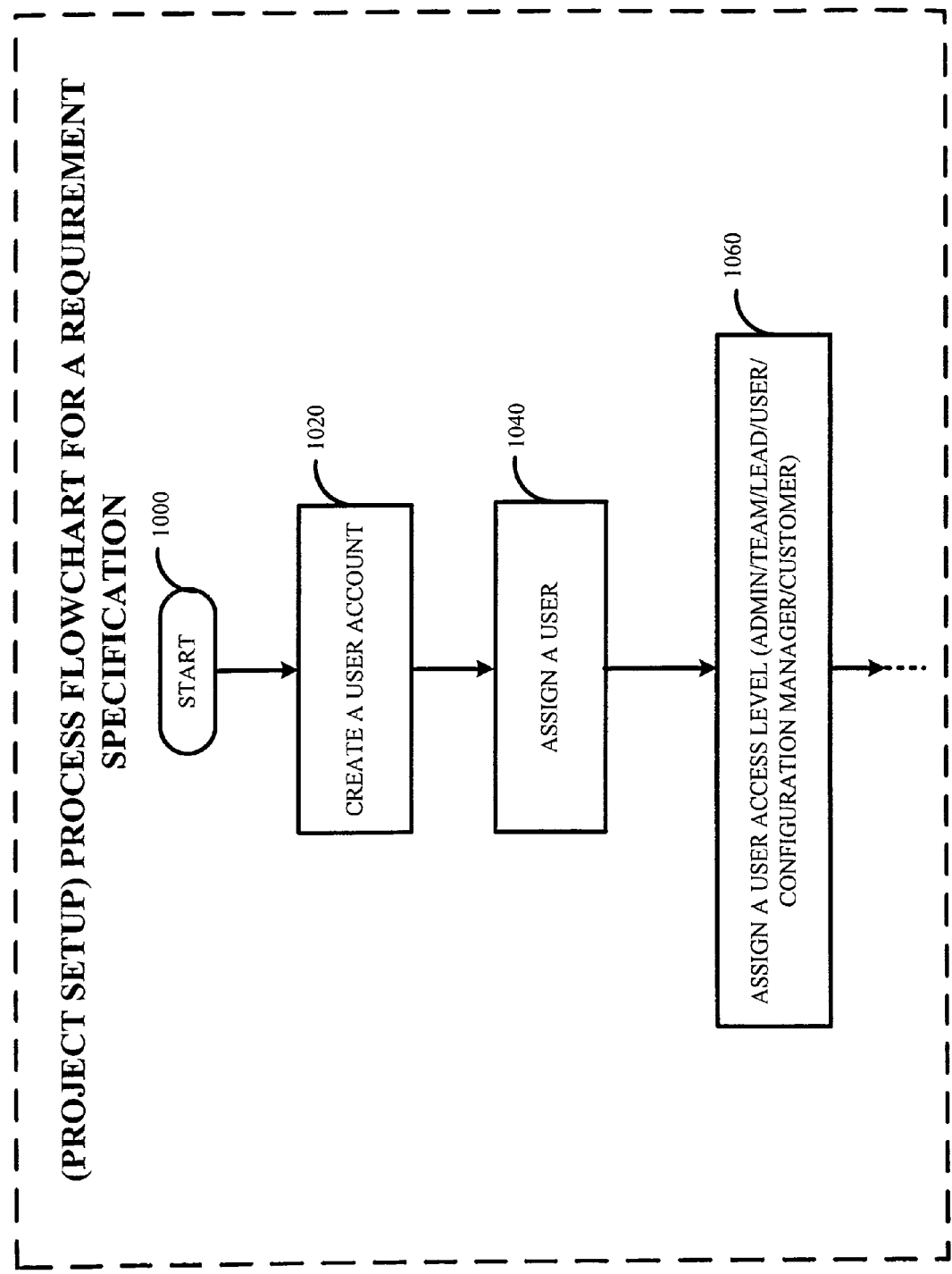
Figure 12B:
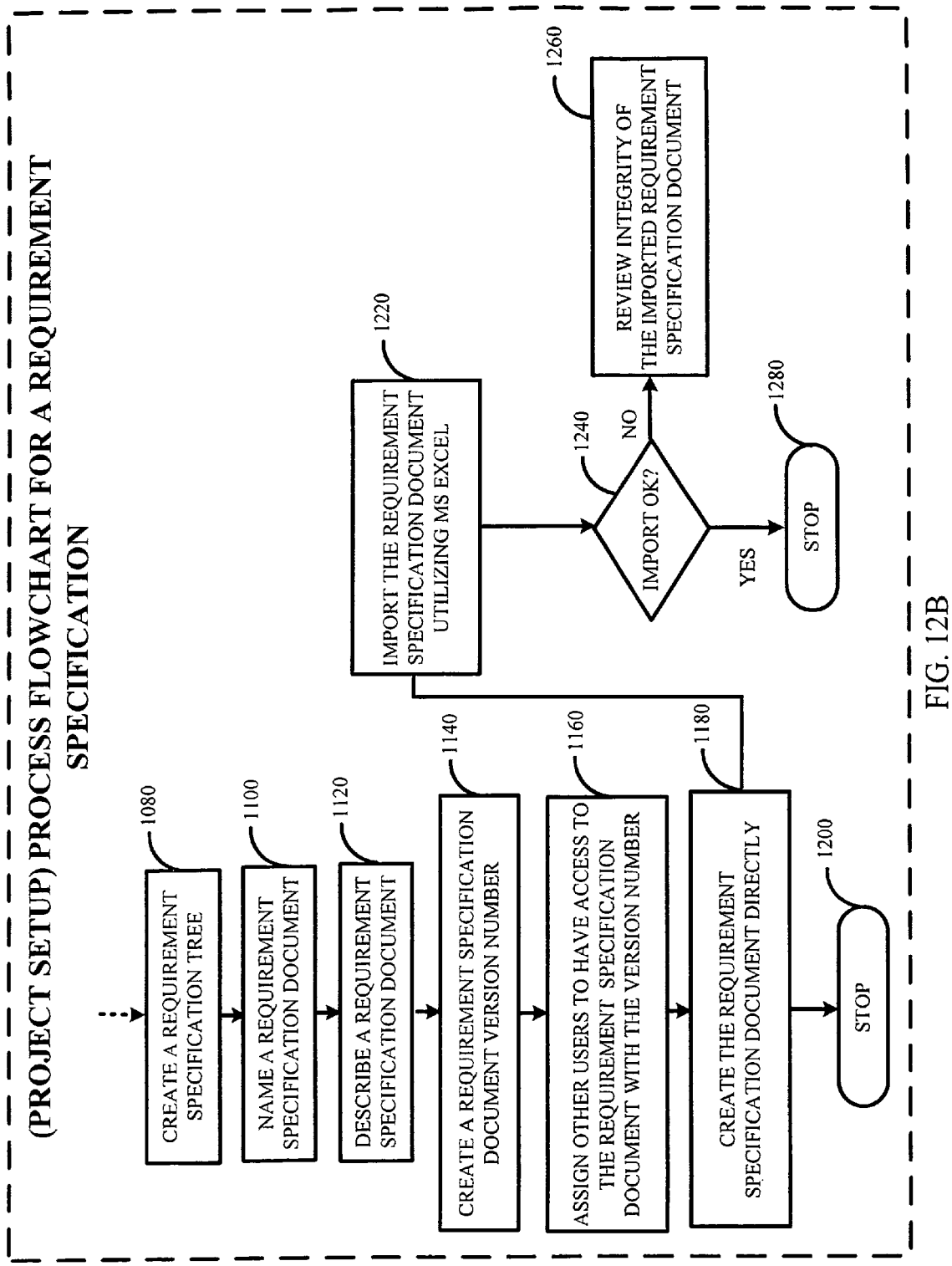

FIGS. 12A and 12B describe a process flowchart for a requirement specification within a project setup.

Figure 13:
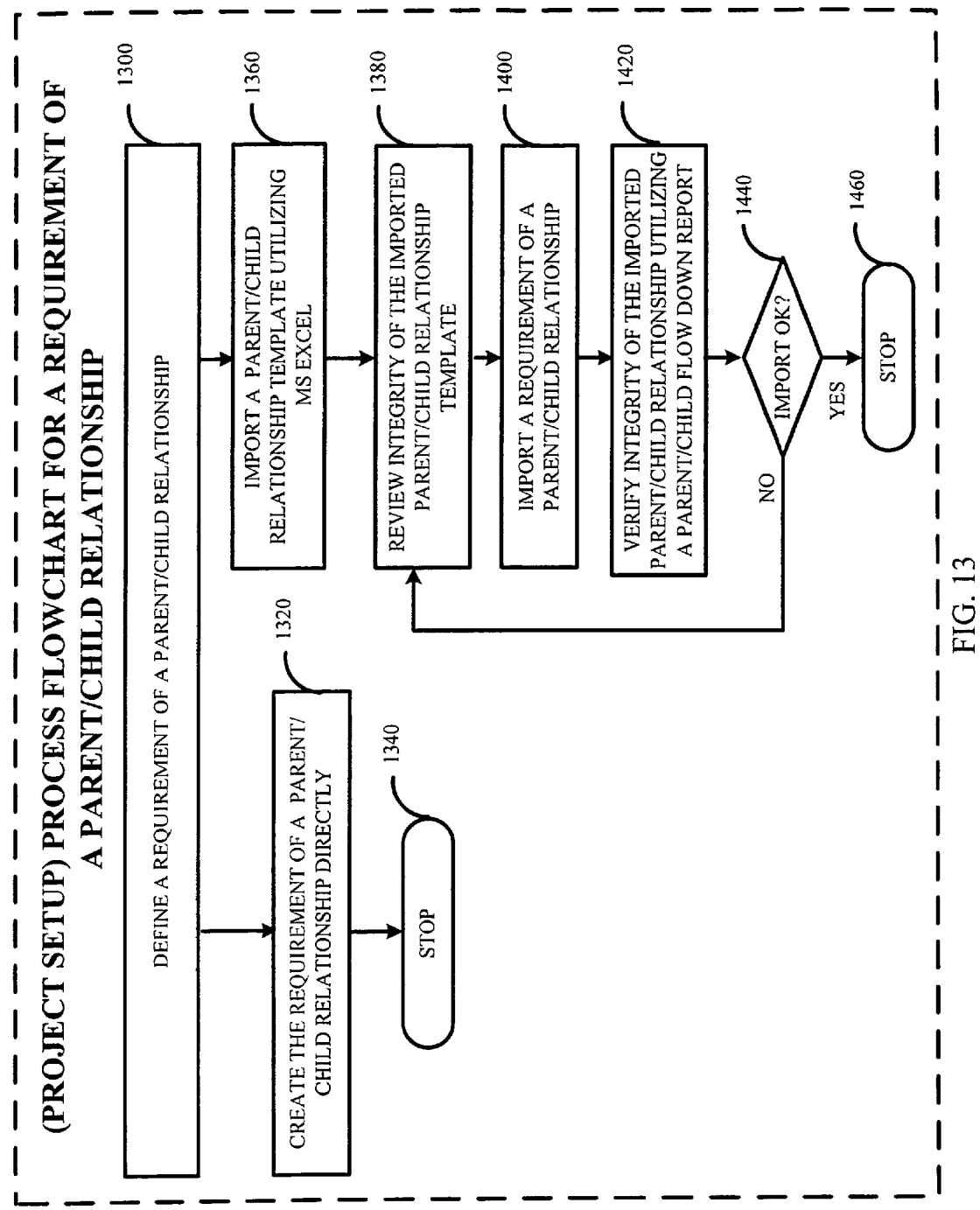

FIG. 13 describes a process flowchart for a requirement of a parent/child (also known as master/slave) relationship within a project setup.

Figure 14:
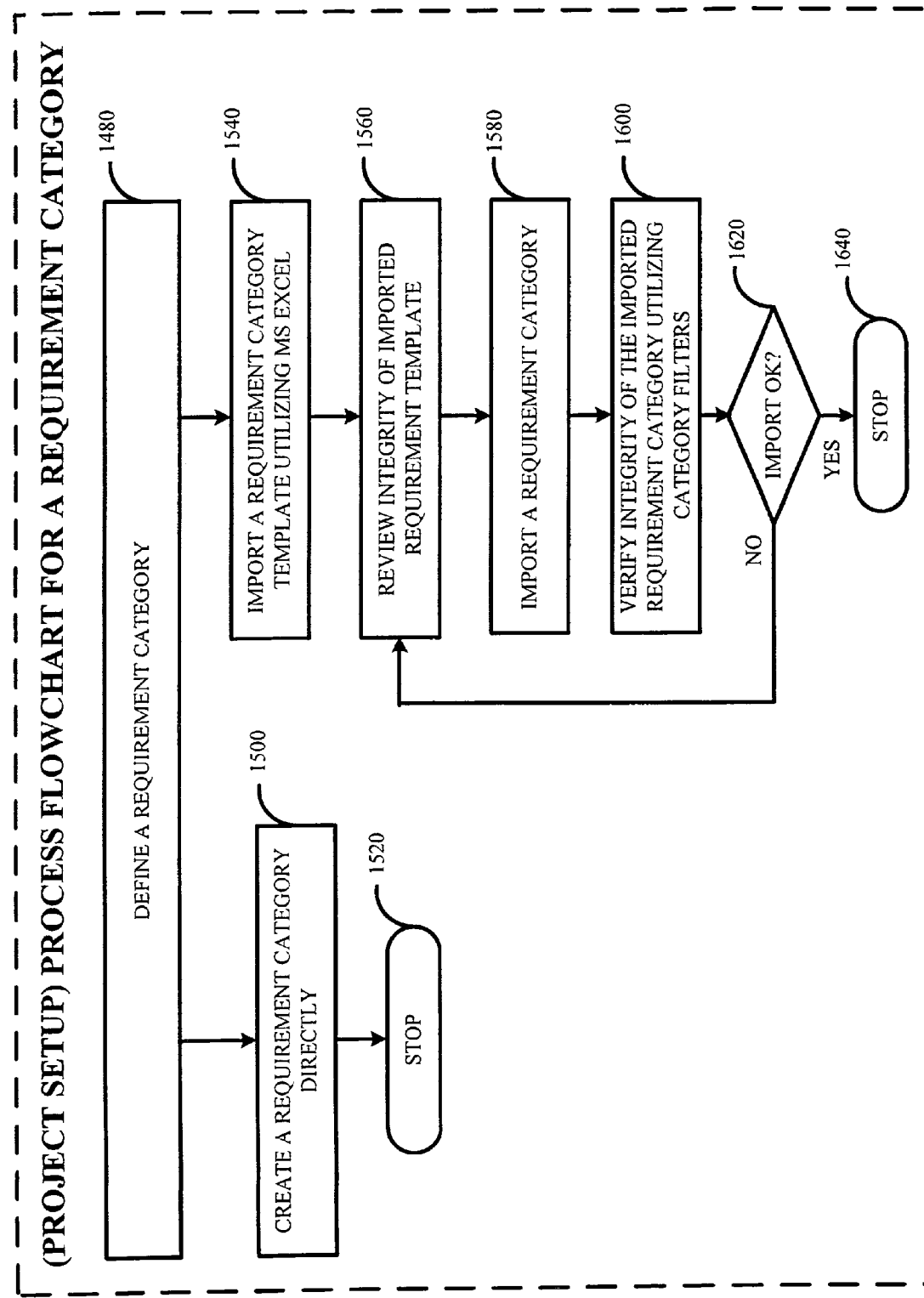

FIG. 14 describes a process flowchart for a requirement category within a project setup.

Figure 15:
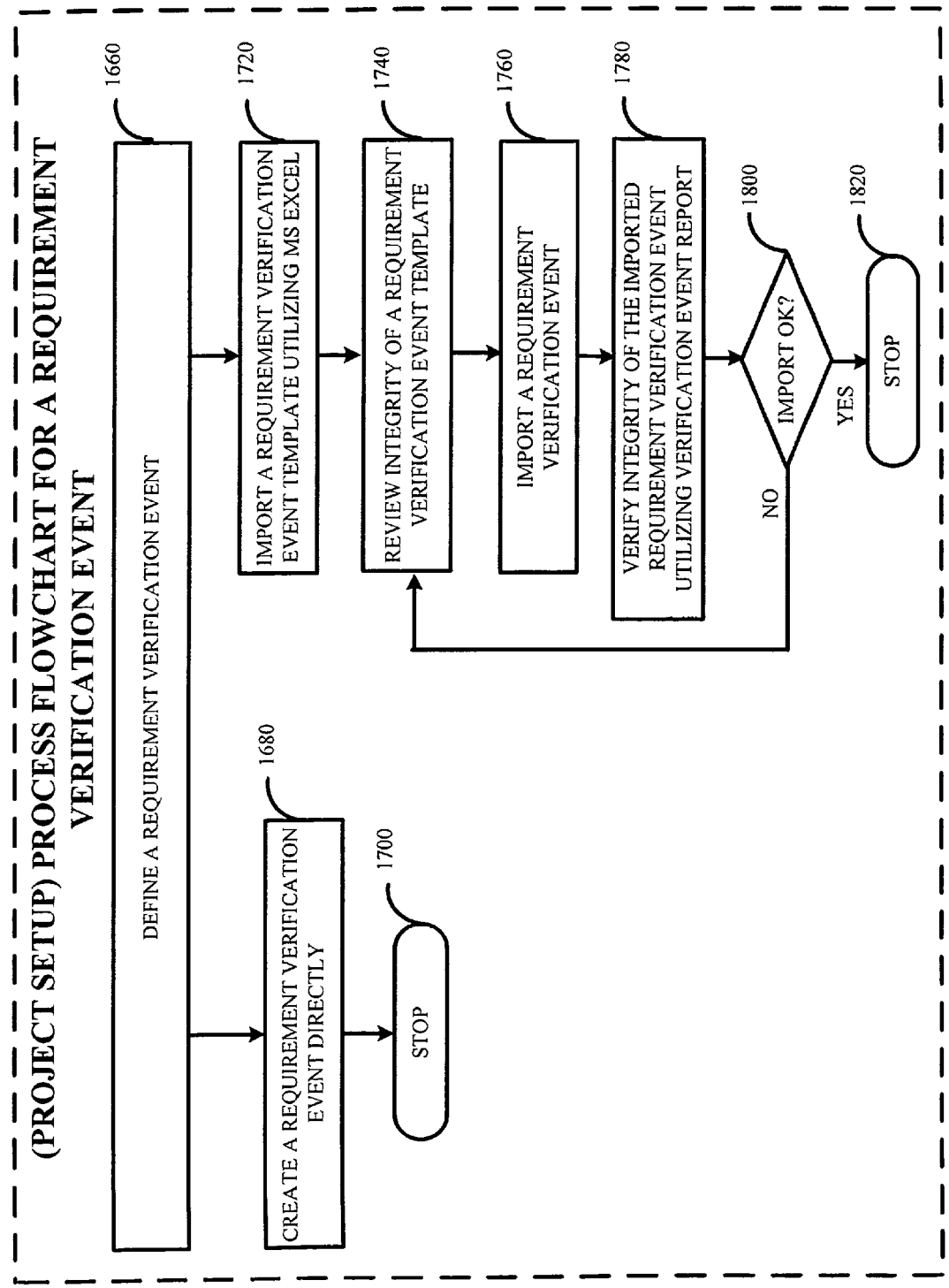

FIG. 15 describes a process flowchart for a requirement verification event within a project setup.

Figure 16:
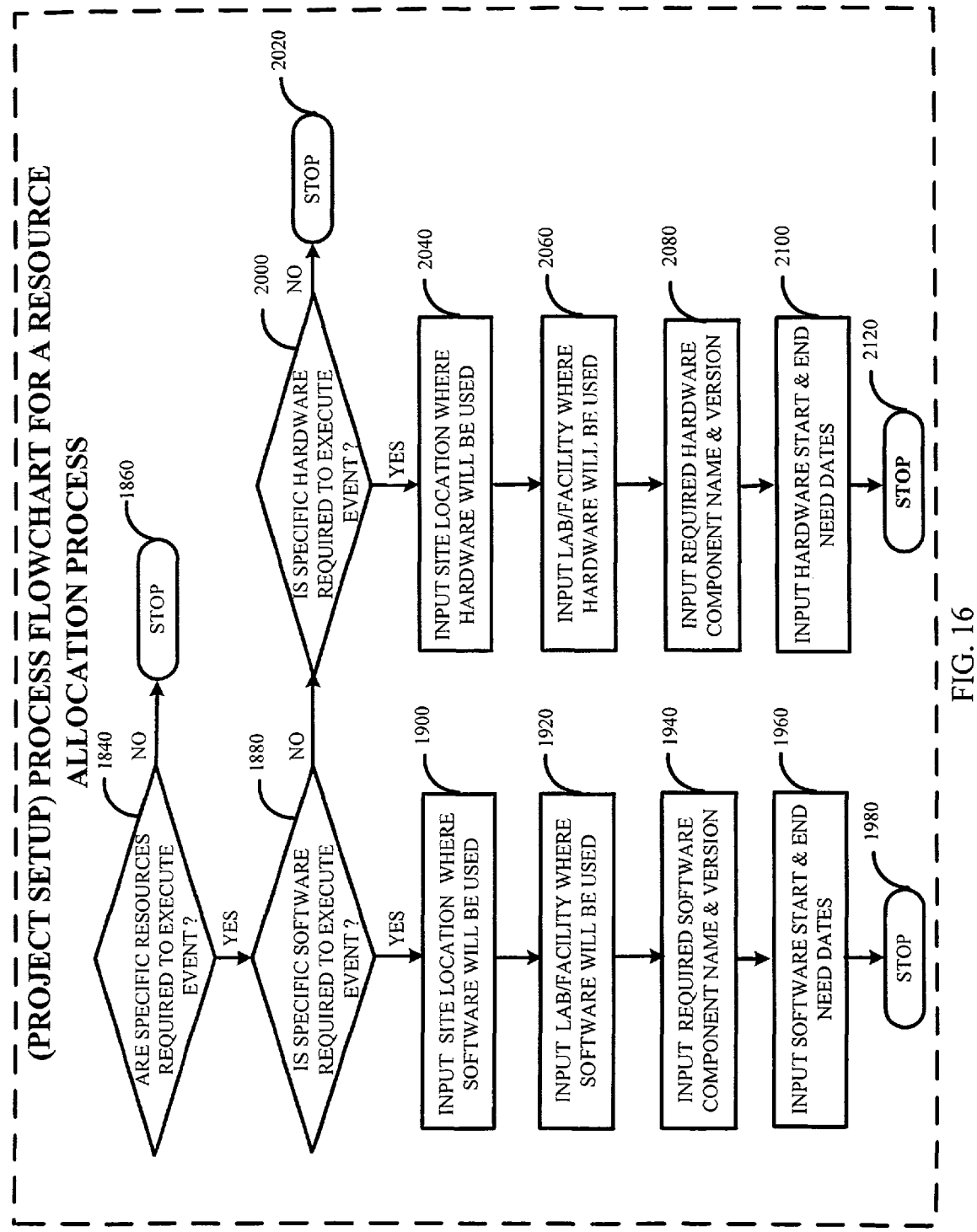

FIG. 16 describes a process flowchart for a resource allocation process within a project setup.

DETAIL DESCRIPTION OF THE PREFERRED EMBODIMENT OF THE INVENTION

Figure 1:
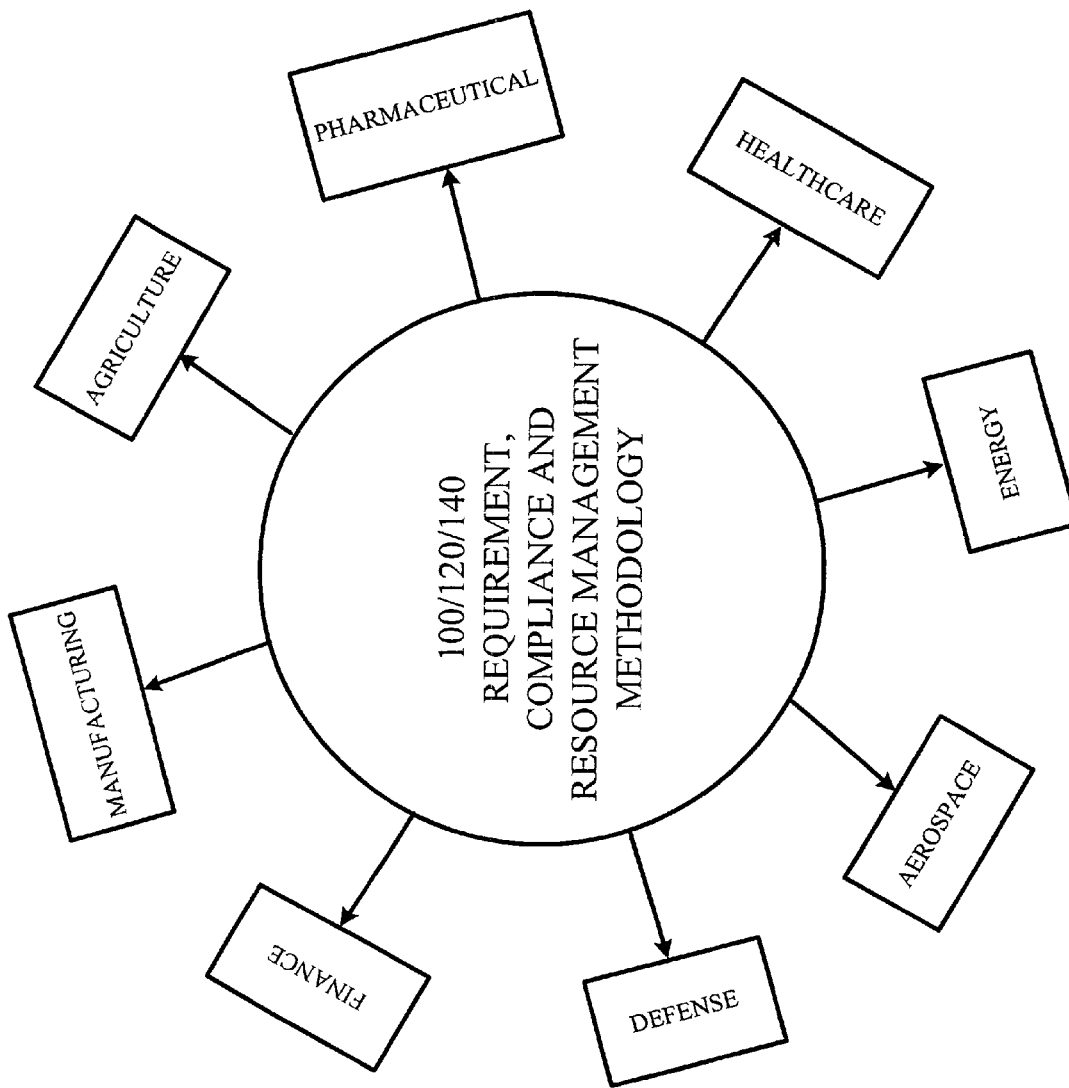
FIG. 1 (schematic diagram) describes various applications of the requirement, compliance and resource management methodology.

FIG. 1 (schematic diagram) describes the various applications of the requirement, compliance and resource management methodology 100 (as described in FIG. 5A) or 120 (as described in FIG. 7A) or 140 (as described in FIG. 9A) in many industries (e.g., manufacturing, agriculture, pharmaceuticals, healthcare, energy, aerospace, defense and finance (including banking)).

Furthermore, the requirement, compliance and resource management methodology 100 or 120 or 140 can be customized to fit any product/service in any industry.

The requirement, compliance and resource management methodology 100 (as described in FIG. 5A) configured/enhanced with the question/answer format of a requirement input module and the fuzzy logic algorithm module can be designated as the requirement, compliance and resource management methodology 120 (as described in FIG. 7A).

Fuzzy means not clear (blurred). Fuzzy logic is a form of approximate reasoning, that can be used to represent variation or imprecision in logic by making use of natural language (NL) in logic.

Approximation is inherent and inevitable in any process step and approximation can be modeled and managed explicitly. A fuzzy logic algorithm module can represent approximations for inputs and outputs in the requirement, compliance and resource management methodology 120.

The requirement, compliance and resource management methodology 120 (as described in FIG. 7A) configured/enhanced with a statistical algorithm module and a weighting logic algorithm module can be designated as the requirement, compliance and resource management methodology 140 (as described in FIG. 9A).

Uncertainty/variation is inherent and inevitable in any process step and uncertainty/variation can be modeled and managed explicitly. A statistical algorithm module can represent uncertainty/variation for inputs and outputs in the requirement, compliance and resource management methodology 140.

The requirement, compliance and resource management methodology 100 or 120 or 140 can be integrated with an enterprise storage system (e.g., an enterprise server) and/or an enterprise device (e.g., a laptop and a mobile internet appliance).

Alternatively, the requirement, compliance and resource management methodology 100 or 120 or 140 can be located at a cloud storage system for software-as-a service (SaaS).

Furthermore, the requirement, compliance and resource management methodology 100 or 120 or 140 is scalable.

Many components of the requirement, compliance and resource management methodology 100 or 120 or 140 are modular to permit automating some functions, but not automating other functions.

Furthermore, the components of the requirement, compliance and resource management methodology 100 or 120 or 140 can include (a) transactional database, (b) management portal/dashboard, (c) business intelligence system, (d) customizable reporting, (e) external access via internet (f) search, (g) document management, (h) messaging/chat and (i) workflow management.

Best practices can be incorporated in the requirement, compliance and resource management methodology 100 or 120 or 140. This means that the requirement, compliance and resource management methodology 100 or 120 or 140 can reflect a defined interpretation as the most effective way to perform a process step and a customer can also modify the best practices.

Furthermore, the requirement, compliance and resource management methodology 100 or 120 or 140 can be configured with an application programming interface (API) to integrate (e.g., direct integration and/or database integration) with other software programs (e.g., MS Word, MS Excel, MS Project and Enterprise Resource Planning (ERP)).

Enterprise Resource Planning (ERP) is an integrated software program/system that operates in near real time and/or real time, without relying on periodic updates with a common database, which supports (a) finance/accounting (general ledger, payables, cash management, fixed assets, receivables, budgeting and consolidation), (b) human resources (payroll, training, benefits, 401K, recruiting and diversity management), (c) manufacturing (bill of materials, engineering, work orders, scheduling, capacity, workflow management, quality control, cost management, manufacturing process, manufacturing projects, manufacturing flow, activity based costing and product life cycle management), (d) supply chain management (order to cash, inventory, order entry, purchasing, product configurator, supply chain planning, supplier scheduling, inspection of goods, claim processing and commissions), (e) project management (costing, billing, time and expense, performance units and activity management) and (f) customer relationship management (sales and marketing, commissions, service, customer contact and call center support).

Figure 2:
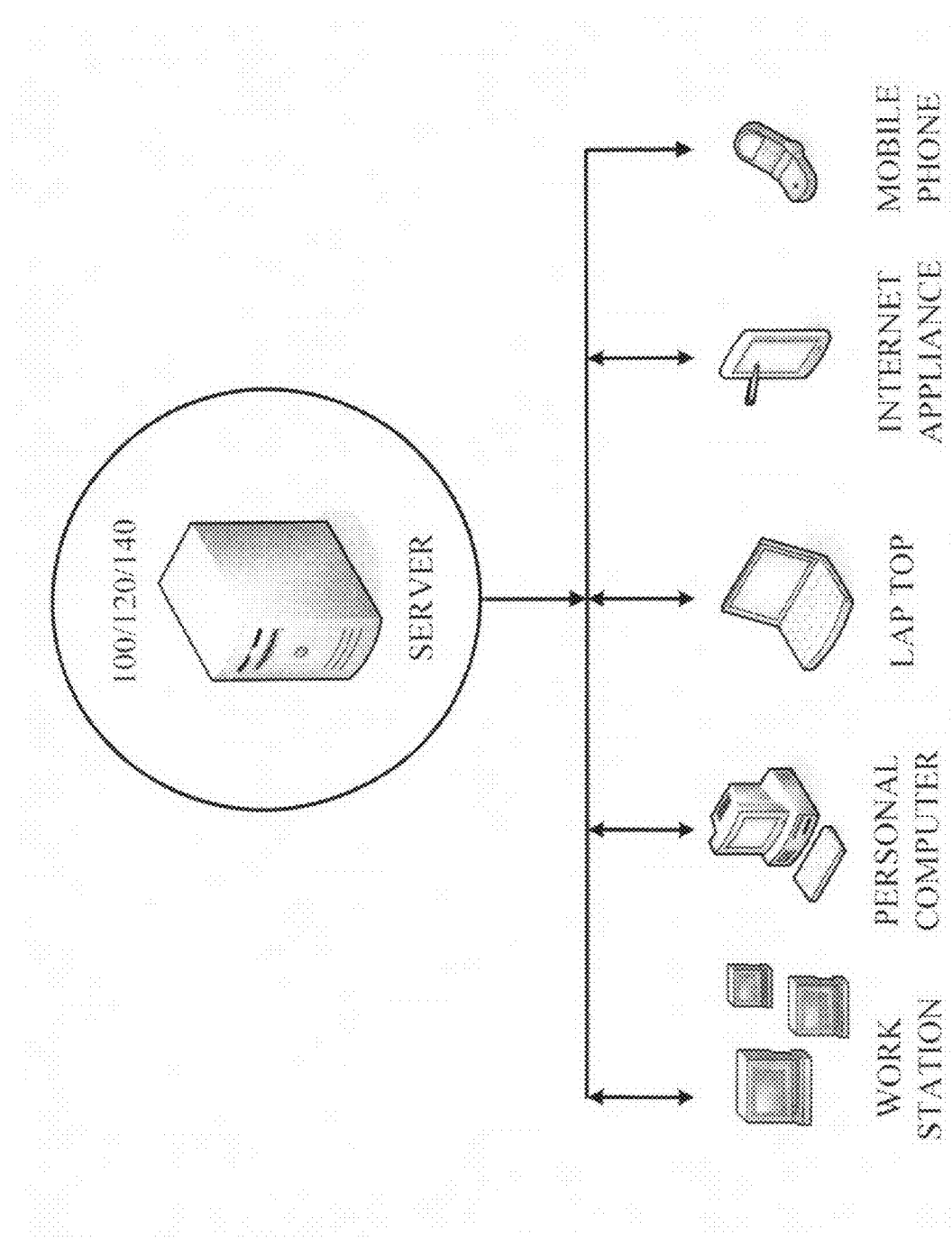
FIG. 2 (schematic diagram) describes the connectivity (both one-way and two-way connectivity) of the requirement, compliance and resource management methodology (located at an enterprise server) with other external systems and/or devices.

FIG. 2 (schematic diagram) describes two-way connection of the requirement, compliance and resource management methodology 100 or 120 or 140 (located at an enterprise storage system) to many systems (e.g., work station) and/or devices (e.g., personal computer, laptop and internet appliance). The internet appliance can be a mobile internet appliance (e.g., iPad).

FIG. 2 (schematic diagram) also describes one-way connection of the requirement, compliance and resource management methodology 100 or 120 or 140 (located at an enterprise storage system) to a mobile phone. The one way connection can illustrate only summary result (summary dash board) with a mobile phone, due to a limitation of the available display screen size.

Figure 3:
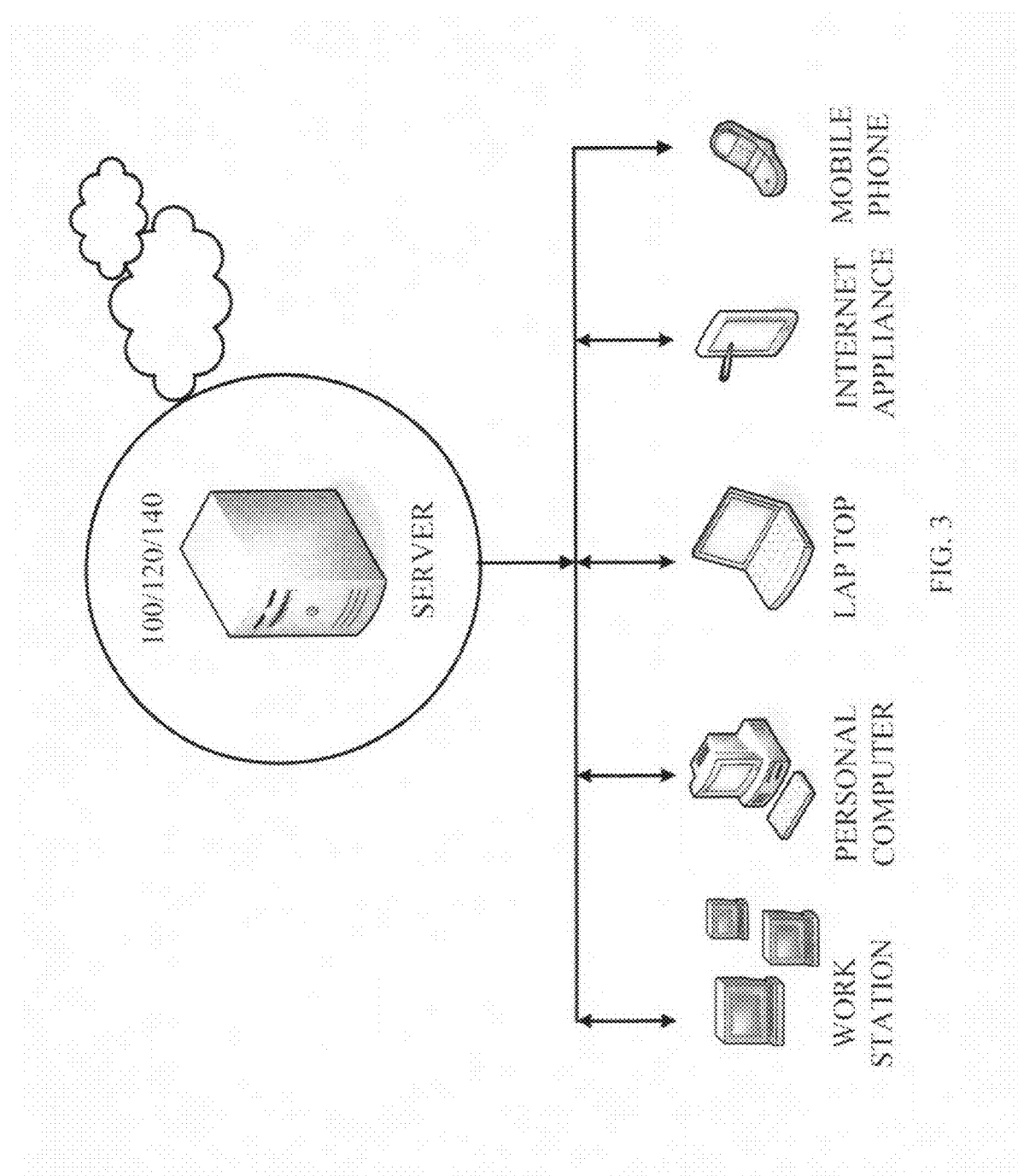
FIG. 3 (schematic diagram) describes the connectivity (both one-way and two-way connectivity) of the requirement, compliance and resource management methodology (located at a cloud server) with other external systems and/or devices.

FIG. 3 (schematic diagram) describes two-way connection of the requirement, compliance and resource management methodology 100 or 120 or 140 (located at a cloud storage system) to many systems (e.g., work station) and/or devices (e.g., personal computer, laptop and internet appliance). The internet appliance can be a mobile internet appliance (e.g., iPad).

FIG. 3 (schematic diagram) also describes one-way connection of the requirement, compliance and resource management methodology 100 or 120 or 140 (located at a cloud storage system) to a mobile phone. The one way connection can illustrate only summary result (summary dash board) with a mobile phone, due to a limitation of the available display screen size.

Figure 4:
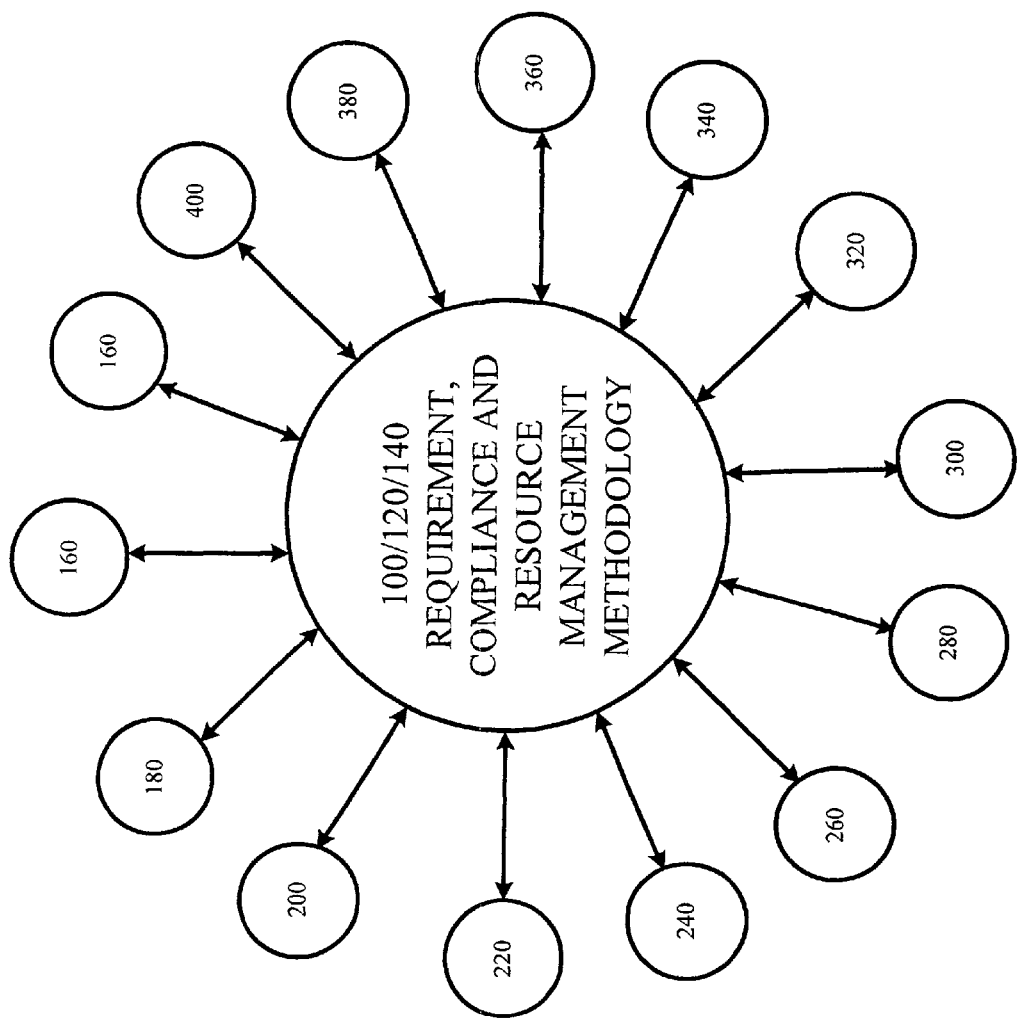
FIG. 4 (schematic diagram) describes the connectivity (two-way connectivity) of the requirement, compliance and resource management methodology with users for near real time and/or real time collaboration between users, product development, procurement, system/test/QA engineering, legal/compliance requirement/management, product management, product marketing, technical support, financial management and executive management.

FIG. 4 (schematic diagram) describes two-way connection of the requirement, compliance and resource management methodology 100 or 120 or 140 to various functional modules.

| Module No. | Description of Functional Modules |
| --- | --- |
| 160 | User |
| 180 | Algorithm Engineering |
| 200 | Hardware Engineering |
| 220 | System Engineering |
| 240 | Subcontracting |
| 260 | Procurement |
| 280 | Product Management |
| 300 | Product Marketing |
| 320 | Technical Support |
| 340 | Internal Legal |

-continued

| Module No. | Description of Functional Modules |
|---|---|
| 360 | External Legal (Compliance) |
| 380 | Financial Management |
| 400 | Executive (General) Management |

FIG. 5A (block diagram) describes the requirement, compliance and resource management methodology 100 and all relevant modules are described below:

| Module No. | Description |
|---|---|
| 100A | Requirement Processing Module |
| 100B | Compliance & Legal Module |
| 100C | Requirement Input Module |
| 100D | Specifications and Matrices Module |
| 100E | Resource Allocation Module |
| 100F | Event Verification Module |
| 100A1 | Graphical User Interface Module |

Event verification module 100F can be configured with an application programming interface (API) to integrate (e.g., direct integration and/or database integration) the requirement, compliance and resource management methodology 100 with other software programs (e.g., MS Word, MS Excel, MS Project and Enterprise Resource Planning (ERP)).

Graphical user interface module 100A1 can be configured a search interface for input data, interpretation of input data, analysis, output data and interpretation of output data.

The requirement processing module 100A can include an embedded constraint analysis tool. It adopts the common idiom that a chain is no stronger than its weakest link.

Assuming the goal of a project and its success/failure measurements are clearly defined, then the process steps of the embedded constraint analysis tool are:
1. identifying all constraints
2. deciding to exploit the constraints (how to get the most out of the constraints)
3. making changes needed to break the first critical constraint
4. If the first critical constraint has been broken, then to go to step 3 in order to break the second critical constrain, the third critical constrain and so on.

Buffer can be used to protect the constraint from varying in the entire the requirement, compliance and resource management methodology. Buffer can allow for normal variation and the occasional upset before and behind the constraint.

FIGS. 5B (schematic chart), 5C (schematic chart), 5D (schematic chart), 5E (schematic chart) and 5F (schematic chart) describe outputs of some components of the embodiment of the requirement, compliance and resource management methodology 100 (as described in FIG. 5A).

The event coordination matrix (ECM) is a tool that can enable cross-functional and cross-enterprise coordination for facilitating verification, validation, certification and accreditation (VVC&A) planning and execution.

The development of the ECM can be driving factor in verification planning activities. Typically ECM can be developed early in the verification planning process to drive an early adoption amongst key stakeholders and also to allow for an identification of potential discrepancies as early as possible.

The responsibility of the development of the ECM primarily relies on inputs from a test and verification (T&V) team, a system engineering (SE) team and an enterprise integration (EI) team, with additional inputs provided by specialty engineering, quality assurance/mission assurance, information assurance and logistics planning.

The development of the ECM is a cross-enterprise activity and is comprised of a four-part process:
1) identification of requirements,
2) identification of analysis, inspection, demonstration and test (AIDT) events,
3) allocation of requirements to specific events, and
4) allocation of events to timelines or key events within schedules.

The development, population and refinement of the ECM is coordinated both within the system engineering & integration (SE&I) organization and prime contractor organization by the EI team to ensure a thorough and balanced approach across the enterprise.

Once all requirements (both imposed and derived) have been addressed through VVC&A and identified by the SE team, then all activities or events where the VVC&A will occur have been identified by the T&V team, the requirements are then allocated to the set of specific events.

Figure 5F:
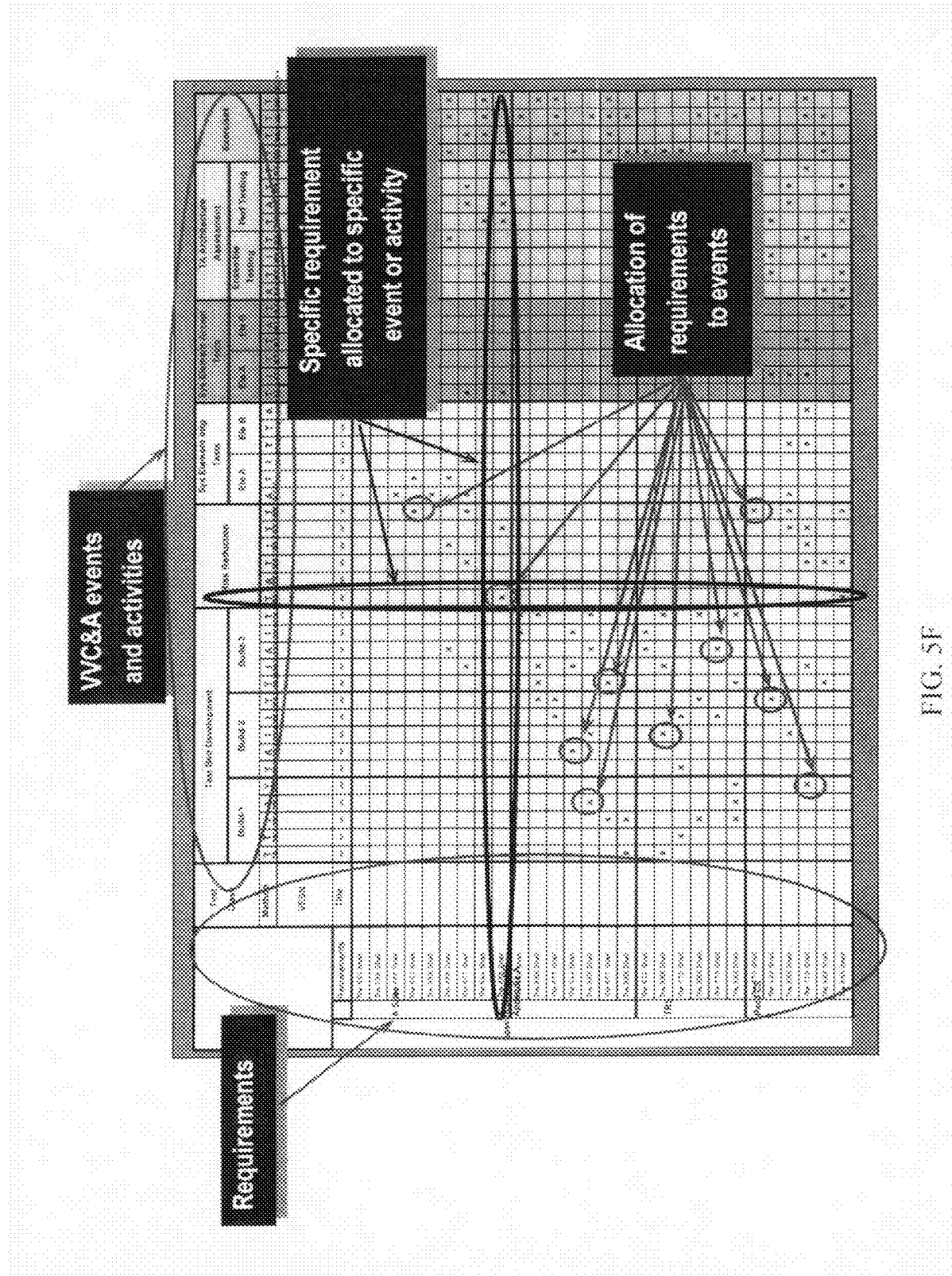

As depicted in FIG. 5F, the left side of the ECM includes the requirements information and the top of the ECM addresses the individual events that are planned to accomplish the VVC&A.

Within the ECM, all activities and events (where VVC&A to be performed) are documented and tracked. The objective of the ECM is to correlate all requirements to specific activities and events. By focusing on all VVC&A activities (as opposed to test only), it becomes possible to optimize the T&V approach across the entire breadth of the program, allowing the T&V team to factor in analysis, inspection and demonstration events into their verification planning. By analyzing the VVC&A activities across the program, the T&V team can act in a truly integrated fashion, optimizing the development and re-use of test data, scenarios, run conditions, truth models, environmental conditions and even the execution of entire events to allow for efficient planning.

By looking at the complete picture of all integrated verification activities, the SE&I organization truly has insight and oversight into the planned activities of the prime contractors and can identify areas of the program, where there is either not enough verification being planned (for example, mission critical requirements (MCRs), interoperability requirements and critical technical parameter (CTP) requirements) or too much verification being planned (redundant or extraneous events).

An added benefit of this integrated approach to verification planning is that it now becomes possible for the T&V organization to report confidence to the customer about when technical functionality will come on-board and also to understand the impact of changes to schedule, performance and budget, thereby facilitating more accurate trade analysis and higher confidence recommendations on how to solve both programmatic and technical problems as they arise.

A key consideration to note is the time-phase approach to the identification of Analysis, Inspection, Demonstration & Test (AIDT) events. Identifying events that only represent final acceptance tests (FAT) as the primary focus of an integrated T&V approach is short-sighted and will not allow the SE&I to truly act as a system integrator, thereby making it much more difficult to report incremental progress (and thus confidence) to the customer. As the program progresses, the SE&I organization has identified analysis events that will occur prior to FAT. These analysis events allow the SE&I organization to analyze the technical details of the prime contractor's exercises, rehearsals and even internal verification activities.

By scheduling analysis events that are centered on both technical capability delivery and reasonable time-phasing, the SE&I organization can more accurately predict when technical capabilities will be delivered and provide more accurate, actionable data upon which the customer can make decisions.

Another key consideration is the design versus acceptance verification. The design verification encompasses those things typically performed once for a system (induced environments, etc.) and, in many cases, by inspection. The acceptance verification can occur on a component-by-component or build-by-build basis. As the requirements are allocated to the events, the verification type (AIDT) is captured in the ECM to ensure that the validation and verification is addressed adequately.

Given the considerations defined above, in order to optimize the benefit of a truly integrated SE&I methodology, all aspects of VVC&A have to be addressed in one matrix ensuring the AIDT and VVC&A activities can be performed once and at the lowest cost, risk and most optimum time/venue.

Tables 6A, 6B, 6C, 6D and 6E describe the features and benefits of the requirement, compliance and resource management methodology 100, as described in FIG. 5A.

The key features and benefits of the requirement, compliance and resource management methodology 100 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPAA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefits (1): Insightful reporting capability provides visibility to critical issues and unresolved actions, enabling efficient resource allocation. Specifications and Matrices Module (100D) Features (2): Overall project completion status. Specifications and Matrices Module (100D) Benefits (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

A major challenge in the requirement, compliance and resource management methodology 100 (as described in FIG. 5A) is in qualitative and imprecise terms.

The use of soft functional requirements in a task-based specification methodology can capture the imprecise requirements and formulate soft functional requirements using a fuzzy logic algorithm module. More specifically, the soft functional requirements can be represented by canonical form in test-score semantics.

FIG. 7A (block diagram) describes another embodiment of the requirement, compliance and resource management methodology, further enhanced by a question and answer format of a requirement input module 100 C1 and a fuzzy logic algorithm module 100F1 and all relevant modules are described below:

| Module No. | Description |
| --- | --- |
| 100A | Requirement Processing Module |
| 100B | Compliance & Legal Module |
| 100C | Requirement Input Module |
| 100D | Specifications and Matrices Module |
| 100E | Resource Allocation Module |
| 100F | Event Verification Module |
| 100A1 | Graphical User Interface Module |
| 100C1 | Question & Answer Format For Requirement Input Module |
| 100F1 | Fuzzy Logic Algorithm Module |

FIGS. 7B (schematic diagram) and 7C (schematic diagram) describes the implementation of a fuzzy logic algorithm module 100F1.

A fuzzy logic algorithm module can be implemented as follows: (a) define linguistic variables and terms, (b) construct membership functions, (c) construct rule base, (d) convert crisp inputs into fuzzy values, utilizing membership functions (fuzzification), (e) evaluate rules in the rule base (inference), (f) combine the results of each rules (inference) and (g) convert outputs into non-fuzzy values (de-fuzzification).

FIG. 7B describes crisp inputs are fed into fuzzifier module to inference module. Inference module is based on rules. The inference module is fed into defuzzifier module then to crisp outputs.

Figure 7C:
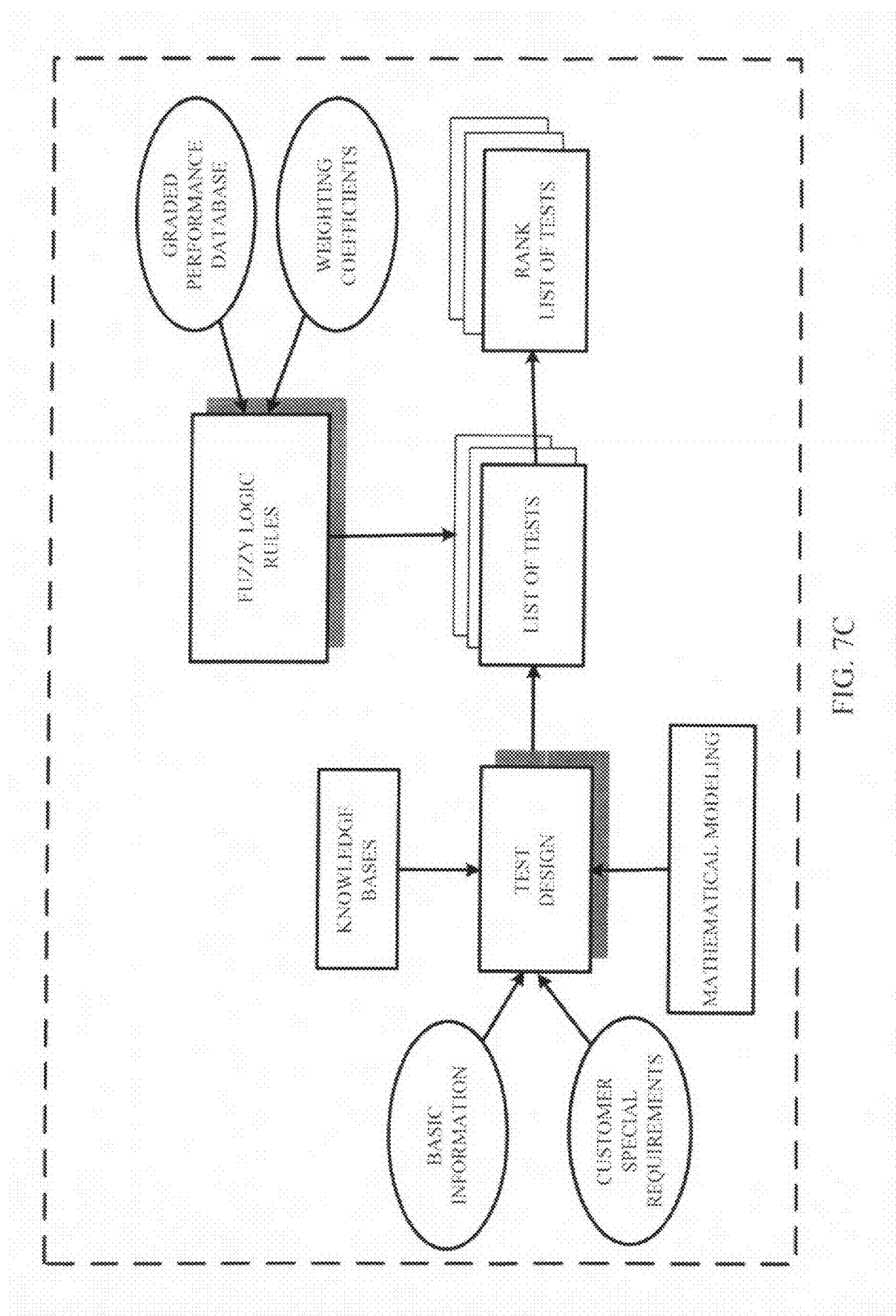

FIG. 7C describes an application of fuzzy logic in a test design. The test design takes into account of (a) basic information, (b) customer special requirements, (c) knowledge rules and (d) mathematical modeling. Test design then creates a list of tests based fuzzy logic rules (fuzzy logic rules are based on graded performance database and weighting coefficients) with ranking.

Tables 8A, 8B, 8C, 8D and 8E describe the features and benefits of the requirement, compliance and resource management methodology 100, as described in FIG. 7A.

The key features and benefits of the requirement, compliance and resource management methodology 120 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPPA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefits (1): Insightful reporting capability provides visibility to critical issues and unresolved actions, enabling efficient resource allocation. Specifications and Matrices Module (100D) Features (2): Overall project completion status. Specifications and Matrices Module (100D) Benefits (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F)

Feature (6): Verification activity linkage to MS project schedules. Event Verification Module (100F) Benefit (6): Tightly couples verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

Question & Answer Format For Requirement Input Module (100C1) Feature (1) Project setup question and answer. Question & Answer Format For Requirement Input Module (100C1) Benefit (1): Step-by-step question and answer that allows user to quickly and easily set up a new project.

Fuzzy Logic Algorithm Module 100F1 Feature (1): Verification completion decision (fuzzy logic). Fuzzy Logic Algorithm Module 100F1 Benefit (1): Enables program decision makers to assess when verification is good enough. Fuzzy Logic Algorithm Module 100F1 Feature (2): "Requirement goodness" estimation (fuzzy logic). Fuzzy Logic Algorithm Module 100F1 Benefit (2): Evaluates requirement goodness thereby reducing requirement rework and verification resource waste.

FIG. 9A (block diagram) describes another embodiment of the requirement, compliance and resource management methodology, further enhanced by a question and answer format of requirement input module 100C1, a fuzzy logic algorithm module 100F1, a statistical algorithm module 100F2 and a weighting logic algorithm module 100F3 and all relevant modules are described below:

| Module No. | Description |
| --- | --- |
| 100A | Requirement Processing Module |
| 100B | Compliance & Legal Module |
| 100C | Requirement Input Module |
| 100D | Specifications and Matrices Module |
| 100E | Resource Allocation Module |
| 100F | Event Verification Module |
| 100A1 | Graphical User Interface Module |
| 100C1 | Question & Answer Format For Requirement Input Module |
| 100F1 | Fuzzy Logic Algorithm Module |
| 100F2 | Statistical Algorithm Module |
| 100F3 | Weighting Logic Algorithm Module |

FIG. 9B (schematic chart) describes the implementation result of a statistical algorithm module 100F2.

FIGS. 9C (schematic chart), 9D (schematic chart) and 9E (schematic chart) describes an implementation of the weighting logic algorithm.

Top-level requirements are decomposed into lower level requirements in a tree format as shown in FIG. 9C.

In FIG. 9C the weighting logic algorithm module 100F3 provides a method of increasing confidence in the prediction of TPMs. Parametric values are vertically summed for each level of integration for a given system (i.e., System, Segment, Element and Assembly) and shown in the "Spec Sum" row. An arbitrary numeric scaling factor or weight is applied to each level of assembly, thereby increasing the influence that the summed value has on the overall system for that particular level of integration. Summed values are multiplied by respective scale factors to produce a scaled total which is then added to yield an overall verification amount, 485 in this example. The system level parametric value of 15 is then divided by 485 to yield 0.0309, an effective system-level scaling factor which can be applied to each measured value of the overall system.

In FIG. 9D the system level scaling factor (0.0309) is multiplied by each measured value in the "tree", then multiplied by the Spec Scale factor from FIG. 9C. To obtain the "Scaled Total" values, the system level scaling factor (0.0309) is multiplies by the "Spec Sum" which is then multiplied by the scale factor for each level of integration. For example, the "Scaled Total" value for the "Segment" level of integration would be: system level scaling factor (0.0309) *Spec Scale Factor (2)*"Spec Sum" (21)=1.30.

In FIG. 9E to obtain the percent total that each level of integration's verification data contributes to the overall system-level TPM, the "Scaled Total" values from FIG. 9D is divided by the System-level requirement value (15). For example, the assembly level contribution would be 9.40/15 or 62.7%.

The requirement, compliance and resource management methodology can provide a method of predicting system performance parameters throughout the program development life cycle. As top-level system requirements or technical performance measurements (TPMs) are assessed, a statistical weighting algorithm gives users the ability to weight or influence the empirical data of some elements more than others in the same set.

As measurements are collected to verify lower level requirements, the requirement, compliance and resource management methodology can provide users with the ability to assign an arbitrary weighting coefficient to these measurements to increase their influence on the top-level performance prediction at a given point in time.

Lower level measurement weighting coefficients are typically greater than higher level coefficients, since there are a fewer system elements (variables) associated with the lower level measurement, thereby increasing measurement confidence.

Tables 10A, 10B, 10C, 10D, 10E and 10F describe the features/benefits of the requirement, compliance and resource management methodology 140, as described in FIG. 9A.

The key features and benefits of the requirement, compliance and resource management methodology 140 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPPA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1):

Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefits (1): Insightful reporting capability provides visibility to critical issues and unresolved actions, enabling efficient resource allocation. Specifications and Matrices Module (100D) Features (2): Overall project completion status. Specifications and Matrices Module (100D) Benefits (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

Question & Answer Format For Requirement Input Module (100C1) Feature (1) Project setup question and answer. Question & Answer Format For Requirement Input Module (100C1) Benefit (1): Step-by-step question and answer that allows user to quickly and easily set up a new project.

Fuzzy Logic Algorithm Module 100F1 Feature (1): Verification completion decision (fuzzy logic). Fuzzy Logic Algorithm Module 100F1 Benefit (1): Enables program decision makers to assess when verification is good enough. Fuzzy Logic Algorithm Module 100F1 Feature (2): "Requirement goodness" estimation (fuzzy logic). Fuzzy Logic Algorithm Module 100F1 Benefit (2): Evaluates requirement goodness thereby reducing requirement rework and verification resource waste.

Statistical Algorithm Module (100F2) Feature (1): Statistics variability. Statistical Algorithm Module (100F2) Benefit (1): Provides statistical estimating capability for empirical results that require statistical modeling to assess performance variability.

Weighting Logic Algorithm Module (100F3) Feature (1): TPM calculator (weighting logic). Weighting Logic Algorithm Module (100F3) Benefit (1): Allows program to calculate value of TPM throughout integration process.

FIGS. 11A (schematic chart) and 11B (schematic chart), describe specification development of a process implementation.

FIG. 11C (schematic chart) describes a typical verification summary sheet of a process implementation.

Figure 11B:
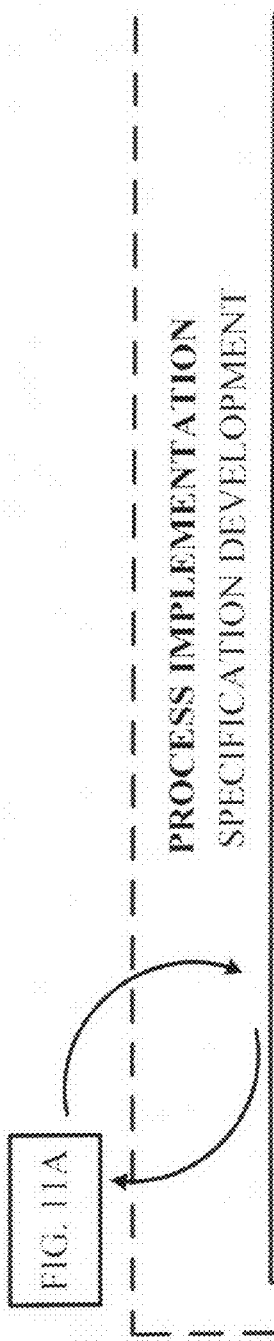
Figure 11E:
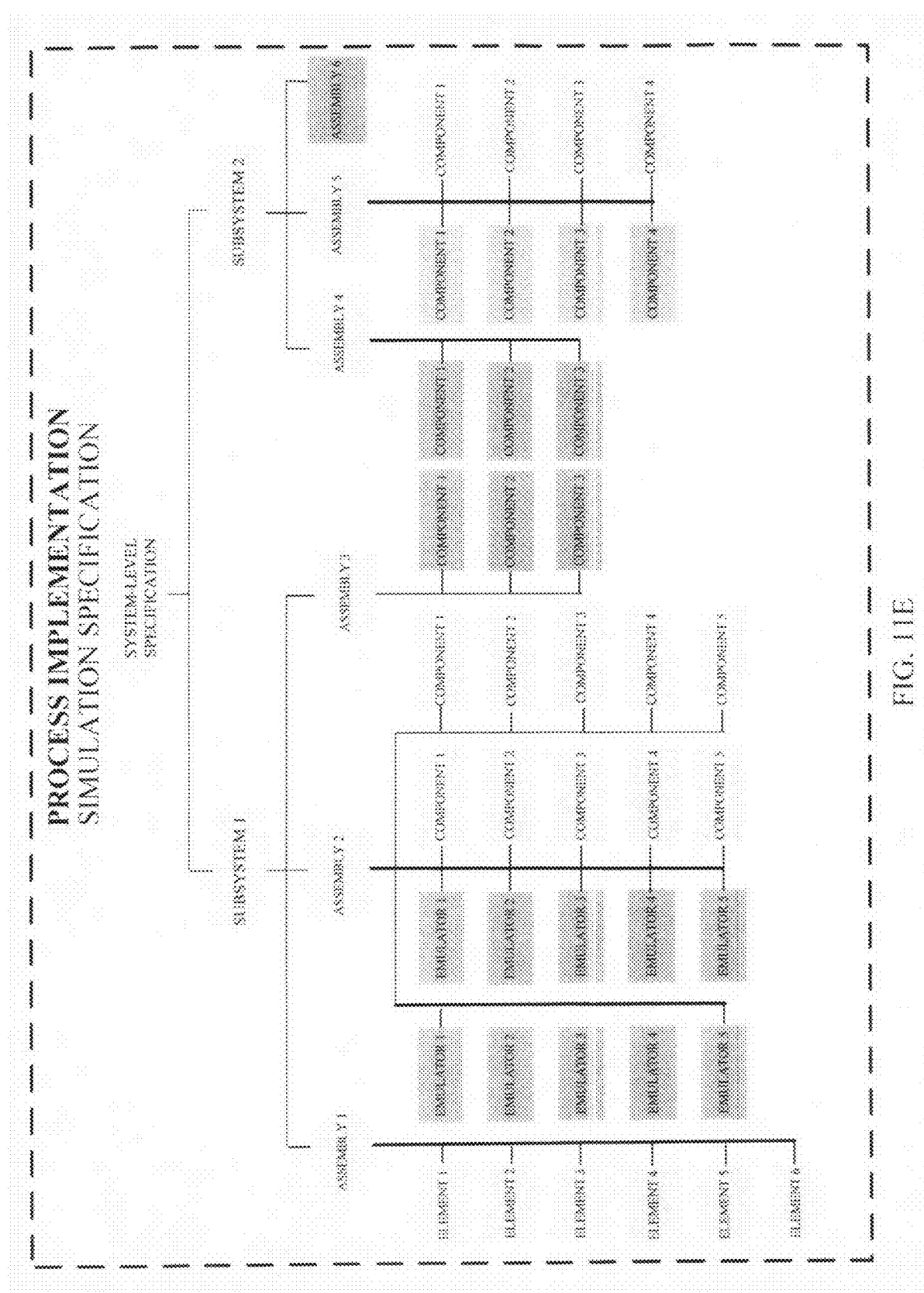

FIG. 11D (schematic chart) describes interaction between summary sheet of a process implementation (as described in FIG. 11C), simulation plans, test plans, test procedures, data verification and data analysis (as described in FIG. 11D) and simulation specifications (as described in FIG. 11E).

FIG. 11E (schematic chart) describes a typical simulation specification of a process implementation.

Figure 11F:
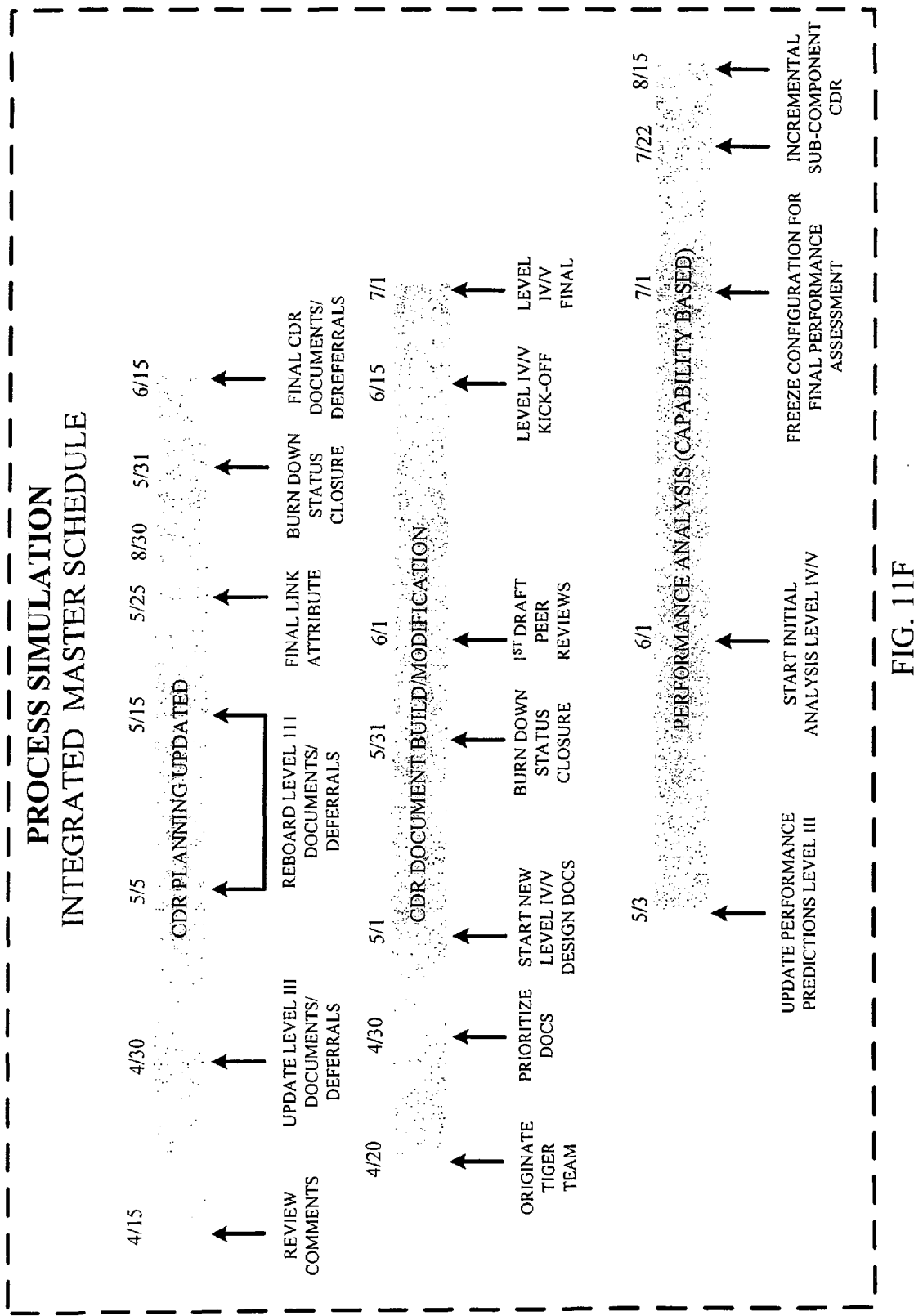

FIG. 11F (schematic chart) describes a typical integrated master schedule of a process implementation.

Figure 11G:
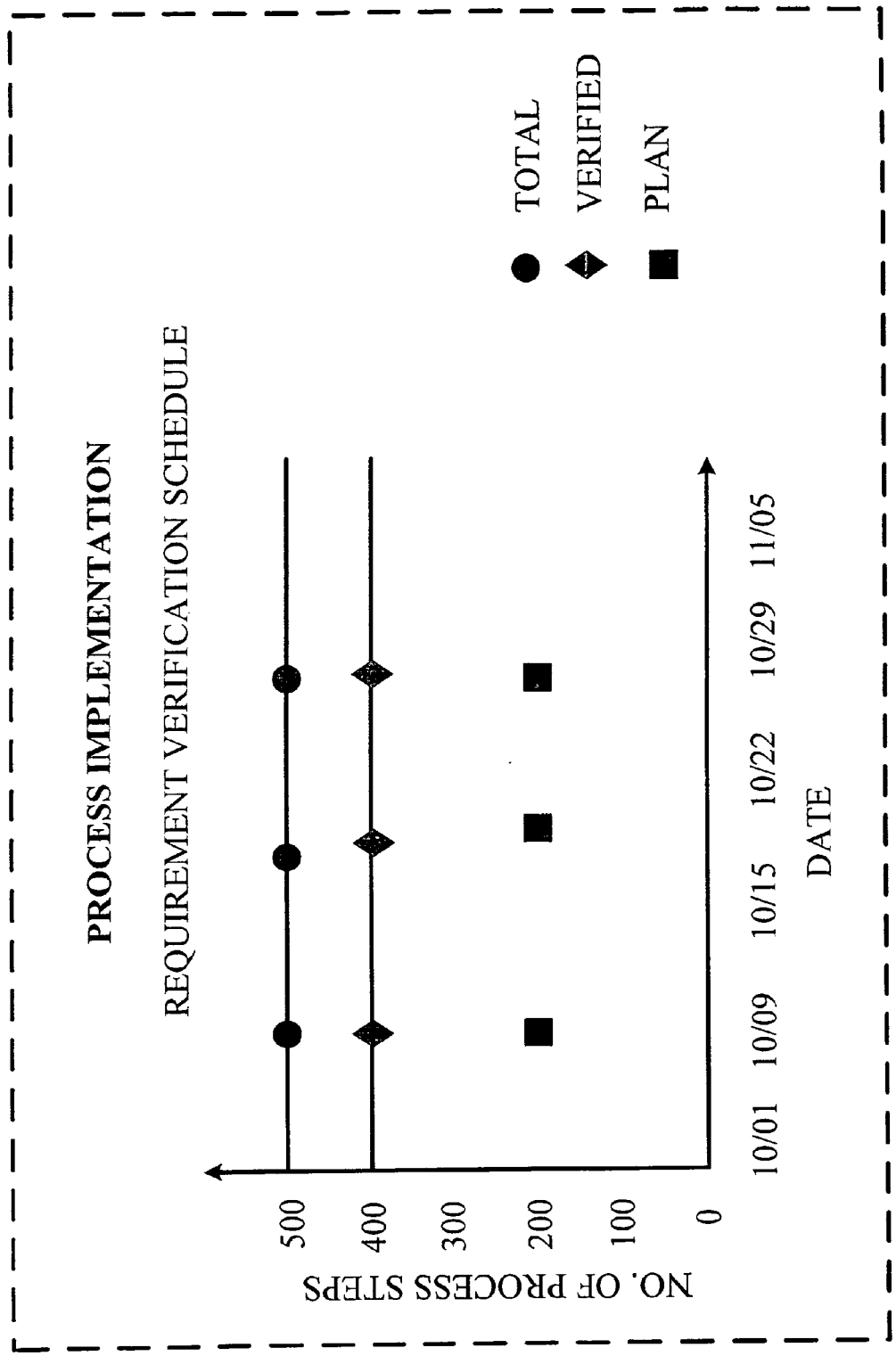

FIG. 11G (schematic chart) describes a requirement verification schedule of a process implementation.

In FIGS. 11A-11B the development of the Event Coordination Sheets (ECS) starts with the baseline specifications. In section 4.0 of system specifications, verification methods are assigned to each requirement in accordance with applicable standards. Requirements are then mapped into verification events based on the event objectives. One approach to defining verification events and determining which requirements should be mapped into specific verification events is to develop a spreadsheet similar to that shown in FIGS. 11A and 11B. TPMs and Mission Critical requirements are then identified. A balanced VSS approach will carefully allocate requirements into appropriate venues such that redundant verification, or "double-booking", is minimized.

In FIGS. 11C-11E once requirements have been allocated into verification venues, the ECS can now be created using the instructions below:

Description: A concise statement delineating the verification to be performed. If the verification has more than one sequence, break the sequence out here. Describe relationships among verification methods (e.g., where test output will be used to perform an analysis). If verification activities have been completed, type "Refer to referenced report(s)." If N/A, provide a brief explanation.

Objectives: Provide a concise overview of verification activity objectives. If the verification activity is conducted in several sequences, objectives may be written for each sequence, provided they address the requirements Success Criteria: Provide a brief description of verification activity pass/fail criteria. This must include the specific data and the results of any analyses that may be required to interpret the data and conclude whether or not the requirement has been successfully verified.

Requirements: (Include requirement paragraph and/or requirement ID.): Provide a comprehensive list of all the requirements that have been allocated to a given verification activity.

Timeline/Schedule: Define the expected duration of the verification activity relative to program milestones. Includes the expected duration of the entire verification activity including verification activity preparation, execution, data acquisition and data post processing and data analysis.

Constraints: Identify limitations on the extent of the verification activity conducted. Identify any special conditions on the test setup, test article, environmental conditions etc.

Pre-Test Requirements: Identify any special test equipment or resources. Reference report number and title only. (Applies only if verification procedure has been completed and report written.) If N/A, provide a brief explanation.

Configuration: Identify the hardware or software configuration for use during this verification procedure(s).

Data Acquisition Requirements: List verification procedure data requirements and products. Reference report number and title only. (Applies only if verification procedure has been completed and report written.).

Evidence of Closure: Identify the document title and number of the referenced report that contains the data which verifies that this (these) requirement(s) have been met. Attach referenced material to verification event form.

Each event will be coordinated using the requirement, compliance and resource management methodology (100/120/140)' dynamic schedule linking capability, which synchronizes events with the Integrated Master Schedule as shown in FIGS. 11F and 11G.

FIGS. 12A and 12B describe a process flowchart for requirement specification within a project setup.

In step 1020 one can create a user account, in step 1040 one can assign an access to a user and in step 1060 one can assign a level of access to the user.

In step 1080 the user can create a requirement specification tree, in step 1100 the user can name a requirement specification document, in step 1120 the user can describe the requirement specification document, in step 1140 the user can create the requirement specification document version number, in step 1160 the user can assign an access to other users, regarding the requirement specification document with a specific version, in step 1180 the user can create the requirement specification document directly, or otherwise in step 1220 the user can import the requirement specification document utilizing MS Excel program. In step 1240 if the imported requirement specification document is OK, then the user can stop in step 1280; otherwise the user can review the integrity of the imported requirement specification document in step 1260.

FIG. 13 describes a process flowchart for a requirement of parent/child (also known as master/slave) relationship within a project setup.

In step 1300 the user can define a requirement of importing parent/child relationship. In step 1320 the user can create the requirement of parent/child relationship directly and if this direct creation of the requirement of parent/child relationship is successful, then the user can stop in step 1340; otherwise, in step 1360 the user can import the parent/child relationship template by utilizing MS Excel program, in step 1380 the user can review the integrity of the imported parent/child relationship template. In step 1400 the user can import a requirement of parent/child relationship, in step 1420 the user can verify the integrity of the imported requirement of parent/child relationship utilizing a parent/child flow down report. In step 1440, if the imported requirement of parent/child relationship is OK, then the user can stop in step 1460; otherwise the user can reiterate to step 1380.

FIG. 14 describes a process flowchart for a requirement category within a project setup.

In step 1480 the user can define a requirement category. In step 1500 the user can create a requirement category directly. If the direct creation of the requirement category is successful, then the user can stop in step 1520; otherwise in step 1540 the user can import a requirement category template utilizing MS Excel program. In step 1560 the user can review the integrity of the imported requirement category template, in step 1580 the user can import a requirement category, in step 1600 the user can verify the integrity of the imported requirement category utilizing category filters. In step 1620 if the imported requirement category is OK, then the user can stop in step 1640; otherwise the user can reiterate to step 1560.

FIG. 15 describes process flowchart for a requirement verification event within a project setup. A verification event is a generic activity used to verify requirements by inspection, demonstration, analysis and test.

In step 1660 the user can define a requirement verification event within a project setup. In step 1680 the user can create a requirement verification event directly. If the direct creation of requirement verification event is successful, then the user can stop in step 1700; otherwise in step 1720 the user can import a requirement verification event template utilizing MS Excel program. In step 1740 the user can review the integrity of the imported requirement verification event template, in step 1760 the user can import a requirement verification event, in step 1780 the user can verify the integrity of the imported requirement verification event, utilizing a verification event report, in step 1800 if the imported requirement verification event is OK, then the user can stop in step 1820; otherwise the user can reiterate to step 1740.

FIG. 16 describes process flowchart for a resource allocation process within a project setup.

In step 1840 the user can ask a question if there are required resources to execute the event, if the answer is no, then the user can stop in step 1860. However, if the answer to the above question is yes, then the user can proceed to step 1880.

In step 1880 the user can ask a question if there are required software to execute the event, if the answer is no, then the user can proceed to step 2000. However, if the answer to the above question is yes, then the user can proceed to step 1900.

In step 1900 the user can input site location, where software will be used. In step 1920 the user can input lab/facility (within the site location) where the software will be used. In step 1940 the user can input required software component name and version. In step 1960 the user can input software start date and end date.

If the answer to the question (is there specific hardware to execute the event?) in step 2000 is yes then the user can proceed to step 2040; otherwise the user can stop at 2020. In step 2040 the user can input site location, where hardware will be used. In step 2060 the user can input lab/facility (within the site location) where the hardware will be used. In step 2080 the user can input required hardware component name and version. In step 2100 the user can input hardware start date and end date.

In the above disclosed specifications "/" has been used to indicate "or". Any example in the above disclosed specifications is by way of an example and not by way of any limitation. All the terms in the above disclosed specifications have a plain meaning for a person ordinary skilled in the art/subject matter. The above disclosed specifications are the preferred embodiments of the present invention. However, they are not intended to be limiting only to the preferred embodiments of the present invention. Numerous variations and/or modifications are possible within the scope of the present invention.

We claim:

1. A method of requirement, compliance and resource management algorithm utilizes:
   a computer system, wherein the computer system comprising: a premise computer system, a mobile computer system and a cloud computer system;
   wherein the computer system comprising: one or more hardware processors in communication with a computer readable medium;
   wherein the computer readable medium stores one or more software modules, including instructions for the method of requirement, compliance and resource management algorithm, that are executable by the one or more hardware processors;
   wherein the method of requirement, compliance and resource management algorithm comprises the steps:
   (a) a requirement input collection algorithm for collecting a requirement or a requirement input data from a data source or an inputting device;
   (b) a compliance requirement input collection algorithm for collecting a compliance input data from a data source or an inputting device;
   (c) a requirement analysis algorithm for analyzing the requirement, the requirement input data and the compliance input data;
   (d) a specification generation algorithm for generating a requirement specification based on the analysis of the requirement, the requirement input data and the compliance input data;
   (e) a resource allocation algorithm for allocating a resource, wherein the resource consisting of: a hardware resource, a software resource, a human resource and a financial resource;
   (f) a verification algorithm for verifying the requirement, the requirement input data or an requirement output data;
   (g) interfacing at least to search for a keyword, utilizing a graphical user interface;
   (h) searching for the keyword, utilizing the graphical user interface;
   (i) a traceability generation algorithm for tracing the requirement input data or the requirement output data; and
   (j) a statistical analysis algorithm to account for variability of the requirement input data, variability of interpretation of the requirement input data, variability of the requirement output data or variability of interpretation of the requirement output data,
   wherein the method of requirement, compliance and resource management algorithm is configured for interfacing with a software program, utilizing an application programming interface.

2. The method of requirement, compliance and resource management algorithm in claim 1, is further configured for collecting the requirement input data in a question and answer format.

3. The method of requirement, compliance and resource management algorithm in claim 1, is further configured for identifying a risk, when the requirement specification changes.

4. The method of requirement, compliance and resource management algorithm in claim 1, further comprising: a set of constraint analysis instructions for an assessment of constraints of the requirement specification.

5. The method of requirement, compliance and resource management algorithm in claim 1, further comprising: a set of fuzzy logic instructions to account for inexactness of the requirement input data, inexactness of interpretation of the requirement input data, inexactness of the requirement output data or inexactness of interpretation of the requirement output data.

6. The method of requirement, compliance and resource management algorithm in claim 1, further comprising: a set of weighting logic instructions for estimating importance of the requirement input data or the requirement output data.

7. The method of requirement, compliance and resource management algorithm in claim 1, further comprising: a set of query-based instructions for inputting the requirement input data, interpreting the requirement input data, inputting the requirement output data or interpreting the requirement output data.

8. The method of requirement, compliance and resource management algorithm in claim 1, further comprising: a graphical charting algorithm for inputting the requirement input data, interpreting the requirement input data, inputting the requirement output data or interpreting the requirement output data.

9. The method of requirement, compliance and resource management algorithm in claim 1, comprising:
   searching algorithm for inputting the requirement input data, interpreting the requirement input data, inputting the requirement output data or interpreting the requirement output data.

10. The method of requirement, compliance and resource management algorithm in claim 1, is further configured for collaboration between users.

11. A method of requirement, compliance and resource management algorithm utilizes:
    a computer system, wherein the computer system comprising: a premise computer system, a mobile computer system and a cloud computer system;

wherein the computer system comprising: one or more hardware processors in communication with a computer readable medium;

wherein the computer readable medium stores one or more software modules, including instructions for the method of requirement, compliance and resource management algorithm, that are executable by the one or more hardware processors;

wherein the method of requirement, compliance and resource management algorithm comprises the steps:
  (a) a requirement input collection algorithm for collecting a requirement or a requirement input data from a data source or an inputting device;
  (b) a requirement analysis algorithm for analyzing the requirement and the requirement input data;
  (c) specification generation algorithm for generating a requirement specification based on the analysis of the requirement and the requirement input data;
  (d) a resource allocation algorithm for allocating a resource, wherein the resource consisting of: a hardware resource, a software resource, a human resource and a financial resource;
  (e) a verification algorithm for verifying the requirement, the requirement input data or the requirement output data;
  (f) interfacing at least to search for a keyword, utilizing a graphical user interface;
  (g) a weighting logic algorithm for estimating importance of the requirement input data or the requirement output data;
  (h) searching for the keyword, utilizing the graphical user interface;
  (i) a traceability generation algorithm for tracing the requirement input data or the requirement output data; and
  (j) a statistical analysis algorithm to account for variability of the requirement input data, variability of interpretation of the requirement input data, variability of the requirement output data or variability of interpretation of the requirement output data, wherein the method of requirement, compliance and resource management algorithm is configured for interfacing with a software program, utilizing an application programming interface.

12. The method of requirement, compliance and resource management algorithm in claim 11, is further configured for collecting the requirement input data in a question and answer format.

13. The method of requirement, compliance and resource management algorithm in claim 11, further comprising: a set of fuzzy logic instructions to account for inexactness or impreciseness of the requirement input data, variability of interpretation of the requirement input data, variability of the requirement output data or variability of interpretation of the requirement output data.

14. The method of requirement, compliance and resource management algorithm in claim 11, further comprising: a set of constraint analysis instructions for an assessment of constraints of the requirement specification.

15. The method of requirement, compliance and resource management algorithm in claim 11, is further configured for collaboration between users.

16. A method of requirement, compliance and resource management algorithm utilizes:
  a computer system, wherein the computer system comprising: a premise computer system, a mobile computer system and a cloud computer system;

wherein the computer system comprising: one or more hardware processors in communication with a computer readable medium;

wherein the computer readable medium stores one or more software modules, including instructions for the method of requirement, compliance and resource management algorithm, that are executable by the one or more hardware processors;

wherein the method of requirement, compliance and resource management algorithm comprises the steps:
  (a) a requirement input collection algorithm for collecting a requirement or a requirement input data from a data source or an inputting device;
  (b) a requirement analysis algorithm for analyzing the requirement and the requirement input data;
  (c) a specification generation algorithm for generating a requirement specification based on the analysis of the requirement and the requirement input data;
  (d) a resource allocation algorithm for allocating a resource, wherein the resource consisting of: a hardware resource, a software resource, a human resource and a financial resource;
  (e) a verification algorithm for verifying the requirement or the requirement input data or an requirement output data;
  (f) interfacing at least to search for a keyword, utilizing a graphical user interface;
  (g) a statistical analysis algorithm to account for variability of the requirement input data, variability of interpretation of the requirement input data, variability of the requirement output data or variability of interpretation of the requirement output data;
  (h) searching for the keyword, utilizing the graphical user interface; and
  (i) a traceability generation algorithm for tracing the requirement input data or the requirement output data, wherein the method of requirement, compliance and resource management algorithm is configured for interfacing with a software program, utilizing an application programming interface.

17. The method of requirement, compliance and resource management algorithm in claim 16, is further configured for collecting the requirement input data in a question and answer format.

18. The method of requirement, compliance and resource management algorithm in claim 16, further comprising: a set of fuzzy logic instructions to account for inexactness or impreciseness of the requirement input data, variability of interpretation of the requirement input data, variability of the requirement output data or variability of interpretation of the requirement output data.

19. The method of requirement, compliance and resource management algorithm in claim 16, is further configured for collaboration between users.

* * * * *